US011032211B2

(12) United States Patent
Gillon et al.

(10) Patent No.: US 11,032,211 B2
(45) Date of Patent: Jun. 8, 2021

(54) COMMUNICATIONS HUB

(71) Applicant: Ooma, Inc., Sunnyvale, CA (US)

(72) Inventors: William M. Gillon, San Mateo, CA (US); Hai Lei, Ottawa (CA); Tobin E. Farrand, Burlingame, CA (US); David A. Bryan, Cedar Park, TX (US)

(73) Assignee: OOMA, INC., Sunnyvale, CA (US)

( * ) Notice: Subject to any disclaimer, the term of this patent is extended or adjusted under 35 U.S.C. 154(b) by 0 days.

(21) Appl. No.: 15/974,308

(22) Filed: May 8, 2018

(65) Prior Publication Data

US 2018/0262441 A1 Sep. 13, 2018

Related U.S. Application Data

(63) Continuation of application No. 15/251,977, filed on Aug. 30, 2016, now Pat. No. 10,009,286, which is a
(Continued)

(51) Int. Cl.
*H04L 12/911* (2013.01)
*H04L 12/24* (2006.01)
(Continued)

(52) U.S. Cl.
CPC .......... *H04L 47/74* (2013.01); *H04L 12/2801* (2013.01); *H04L 12/2863* (2013.01);
(Continued)

(58) Field of Classification Search
CPC . H04L 47/74; H04L 12/2865; H04L 12/2863; H04L 67/2838; H04L 67/141;
(Continued)

(56) References Cited

U.S. PATENT DOCUMENTS 5,323,444 A 6/1994 Ertz et al.
5,425,085 A 6/1995 Weinberger et al.
(Continued)

FOREIGN PATENT DOCUMENTS

CA 2949211 C 2/2019
CA 2954351 C 4/2020
(Continued)

OTHER PUBLICATIONS

"International Search Report" and "Written Opinion of the International Searching Authority," dated Nov. 7, 2014 for App. No. PCT/US2014/044945, filed Jun. 30, 2014. 12 pages.
(Continued)

*Primary Examiner* — Hassan Kizou
*Assistant Examiner* — Abdullahi Ahmed
(74) *Attorney, Agent, or Firm* — Carr & Ferrell LLP

(57) ABSTRACT

A method for bandwidth sharing is provided. The method may include getting a list of neighboring communications hubs, the neighboring communications hubs being disposed in respective neighboring residences. The neighboring communications hubs may be communicatively coupled to the first communications hub using a first broadband data network provisioned by an Internet Service Provider (ISP), and the neighboring residences may be within a same predetermined geographic region as the first residence or within a predetermined temporal distance on a data network from the first residence. The method determines if a data requirement exceeds bandwidth available to the first communications hub and provides a request for data to a neighboring communications hub. The request corresponds to the data requirement. The method then receives data responsive to the request from the neighboring communications hub.

21 Claims, 13 Drawing Sheets

Related U.S. Application Data continuation-in-part of application No. 14/708,132, filed on May 8, 2015, now Pat. No. 9,521,069.

(51) Int. Cl.

| | | |
|---|---|---|
| *H04L 12/28* | (2006.01) | |
| *H04L 12/919* | (2013.01) | |
| *H04L 12/841* | (2013.01) | |
| *H04L 12/741* | (2013.01) | |
| *H04L 12/707* | (2013.01) | |
| *H04L 12/703* | (2013.01) | |
| *H04L 29/06* | (2006.01) | |
| *H04L 12/26* | (2006.01) | |
| *H04L 29/08* | (2006.01) | |

(52) U.S. Cl.
CPC .......... *H04L 12/2865* (2013.01); *H04L 41/12* (2013.01); *H04L 41/5019* (2013.01); *H04L 43/0882* (2013.01); *H04L 45/22* (2013.01); *H04L 45/28* (2013.01); *H04L 45/74* (2013.01); *H04L 47/283* (2013.01); *H04L 47/765* (2013.01); *H04L 67/141* (2013.01); *H04L 67/2838* (2013.01); *H04L 69/14* (2013.01)

(58) Field of Classification Search
CPC . H04L 43/0882; H04L 41/5019; H04L 45/74; H04L 69/14; H04L 45/28
See application file for complete search history.

(56) References Cited

U.S. PATENT DOCUMENTS

| | | | |
|---|---|---|---|
| 5,463,595 A | 10/1995 | Rodhall et al. | |
| 5,519,769 A | 5/1996 | Weinberger et al. | |
| 5,596,625 A | 1/1997 | LeBlanc | |
| 5,598,460 A | 1/1997 | Tendler | |
| 5,796,736 A | 8/1998 | Suzuki | |
| 5,991,301 A | 11/1999 | Christie | |
| 5,999,611 A | 12/1999 | Tatchell et al. | |
| 6,023,724 A | 2/2000 | Bhatia et al. | |
| 6,104,711 A | 8/2000 | Voit | |
| 6,128,481 A | 10/2000 | Houde et al. | |
| 6,148,190 A | 11/2000 | Bugnon et al. | |
| 6,201,856 B1 | 3/2001 | Orwick et al. | |
| 6,202,169 B1 | 3/2001 | Razzaghe-Ashrafi et al. | |
| 6,266,397 B1 | 7/2001 | Stoner | |
| 6,282,574 B1 | 8/2001 | Voit | |
| 6,298,064 B1 | 10/2001 | Christie | |
| 6,304,572 B1 | 10/2001 | Christie | |
| 6,377,938 B1 | 4/2002 | Block et al. | |
| 6,452,932 B1 | 9/2002 | Christie | |
| 6,463,052 B1 | 10/2002 | Christie | |
| 6,473,429 B1 | 10/2002 | Christie | |
| 6,487,197 B1 | 11/2002 | Elliott | |
| 6,577,638 B1 | 6/2003 | Tashiro et al. | |
| 6,594,246 B1 | 7/2003 | Jorgensen | |
| 6,615,264 B1 | 9/2003 | Stoltz et al. | |
| 6,633,561 B2 | 10/2003 | Christie | |
| 6,661,340 B1 | 12/2003 | Saylor et al. | |
| 6,665,429 B1 | 12/2003 | Christie | |
| 6,690,932 B1 | 2/2004 | Barnier et al. | |
| 6,697,358 B2 | 2/2004 | Bernstein | |
| 6,714,545 B1 | 3/2004 | Hugenberg et al. | |
| 6,775,267 B1 | 8/2004 | Kung et al. | |
| 6,778,517 B1 | 8/2004 | Lou et al. | |
| 6,778,528 B1 | 8/2004 | Blair et al. | |
| 6,781,983 B1 | 8/2004 | Armistead | |
| 6,914,900 B1 | 7/2005 | Komatsu et al. | |
| 6,934,258 B1 | 8/2005 | Smith et al. | |
| 7,113,090 B1 | 9/2006 | Saylor et al. | |
| 7,124,506 B2 | 10/2006 | Yamanashi et al. | |
| 7,127,043 B2 | 10/2006 | Morris | |
| 7,127,506 B1 | 10/2006 | Schmidt et al. | |
| 7,154,891 B1 | 12/2006 | Callon | |
| 7,280,495 B1 | 10/2007 | Zweig et al. | |
| 7,295,660 B1 | 11/2007 | Higginbotham et al. | |
| 7,342,925 B2 | 3/2008 | Cherchali et al. | |
| 7,376,124 B2 | 5/2008 | Lee et al. | |
| 7,394,803 B1 | 7/2008 | Petit-Huguenin et al. | |
| 7,599,356 B1 | 10/2009 | Barzegar et al. | |
| 7,733,850 B1 | 6/2010 | Croak et al. | |
| 7,733,859 B2 | 6/2010 | Takahashi et al. | |
| 7,844,034 B1 | 11/2010 | Oh et al. | |
| 8,098,798 B2 | 1/2012 | Goldman et al. | |
| 8,140,392 B2 | 3/2012 | Altberg et al. | |
| 8,180,316 B2 | 5/2012 | Hwang | |
| 8,208,955 B1 | 6/2012 | Nelson | |
| 8,331,547 B2 | 12/2012 | Smith et al. | |
| 8,350,694 B1 | 1/2013 | Trundle et al. | |
| 8,515,021 B2 | 8/2013 | Farrand et al. | |
| 8,577,000 B1 | 11/2013 | Brown | |
| 8,634,520 B1 | 1/2014 | Morrison et al. | |
| 8,804,697 B1 | 8/2014 | Capper et al. | |
| 8,837,698 B2 | 9/2014 | Altberg et al. | |
| 8,988,232 B1 | 3/2015 | Sloo et al. | |
| 9,087,515 B2 | 7/2015 | Tsuda | |
| 9,147,054 B1 | 9/2015 | Beal et al. | |
| 9,179,279 B2 | 11/2015 | Zussman | |
| 9,225,626 B2 | 12/2015 | Capper et al. | |
| 9,319,531 B1 | 4/2016 | Capper et al. | |
| 9,386,148 B2 | 7/2016 | Farrand et al. | |
| 9,386,414 B1 | 7/2016 | Mayor et al. | |
| 9,426,288 B2 | 8/2016 | Farrand et al. | |
| 9,521,069 B2 | 12/2016 | Gillon et al. | |
| 9,560,198 B2 | 1/2017 | Farrand et al. | |
| 9,633,547 B2 | 4/2017 | Farrand et al. | |
| 9,667,782 B2 | 5/2017 | Farrand et al. | |
| 9,787,611 B2 | 10/2017 | Gillon et al. | |
| 9,826,372 B2 | 11/2017 | Jeong | |
| 9,905,103 B2 | 2/2018 | Hsieh | |
| 9,929,981 B2 | 3/2018 | Gillon et al. | |
| 10,009,286 B2 * | 6/2018 | Gillon ................ H04L 47/74 | |
| 10,116,796 B2 | 10/2018 | Im et al. | |
| 10,135,976 B2 | 11/2018 | Farrand et al. | |
| 10,158,584 B2 | 12/2018 | Gillon et al. | |
| 10,192,546 B1 | 1/2019 | Piersol et al. | |
| 10,255,792 B2 | 4/2019 | Farrand et al. | |
| 10,263,918 B2 | 4/2019 | Gillon et al. | |
| 10,297,250 B1 | 5/2019 | Blanksteen et al. | |
| 10,341,490 B2 | 7/2019 | Im et al. | |
| 10,469,556 B2 | 11/2019 | Frame et al. | |
| 10,553,098 B2 | 2/2020 | Hart et al. | |
| 10,911,368 B2 | 2/2021 | Gillon et al. | |
| 2001/0053194 A1 | 12/2001 | Johnson | |
| 2002/0016718 A1 | 2/2002 | Rothschild et al. | |
| 2002/0035556 A1 | 3/2002 | Shah et al. | |
| 2002/0037750 A1 | 3/2002 | Hussain et al. | |
| 2002/0038167 A1 | 3/2002 | Chirnomas | |
| 2002/0057764 A1 | 5/2002 | Salvucci et al. | |
| 2002/0085692 A1 | 7/2002 | Katz | |
| 2002/0130784 A1 | 9/2002 | Suzuki et al. | |
| 2002/0133614 A1 * | 9/2002 | Weerahandi .......... H04L 41/142 709/237 |
| 2002/0140549 A1 | 10/2002 | Tseng | |
| 2002/0165966 A1 | 11/2002 | Widegren et al. | |
| 2003/0027602 A1 | 2/2003 | Han et al. | |
| 2003/0058844 A1 | 3/2003 | Sojka et al. | |
| 2003/0099334 A1 | 5/2003 | Contractor | |
| 2003/0119492 A1 | 6/2003 | Timmins et al. | |
| 2003/0133443 A1 | 7/2003 | Klinker et al. | |
| 2003/0141093 A1 | 7/2003 | Tirosh et al. | |
| 2003/0158940 A1 | 8/2003 | Leigh | |
| 2003/0164877 A1 | 9/2003 | Murai | |
| 2003/0184436 A1 | 10/2003 | Seales et al. | |
| 2003/0189928 A1 | 10/2003 | Xiong | |
| 2004/0001512 A1 | 1/2004 | Challener et al. | |
| 2004/0010472 A1 | 1/2004 | Hilby et al. | |
| 2004/0010569 A1 | 1/2004 | Thomas et al. | |
| 2004/0017803 A1 | 1/2004 | Lim et al. | |
| 2004/0059821 A1 | 3/2004 | Tang et al. | |
| 2004/0086093 A1 | 5/2004 | Schranz | |
| 2004/0090968 A1 | 5/2004 | Kimber et al. | |
| 2004/0105444 A1 | 6/2004 | Korotin et al. | |

(56) References Cited

U.S. PATENT DOCUMENTS

| | | |
|---|---|---|
| 2004/0160956 A1 | 8/2004 | Hardy et al. |
| 2004/0235509 A1 | 11/2004 | Burritt et al. |
| 2005/0027887 A1 | 2/2005 | Zimler et al. |
| 2005/0036590 A1 | 2/2005 | Pearson et al. |
| 2005/0053209 A1 | 3/2005 | D'Evelyn et al. |
| 2005/0074114 A1 | 4/2005 | Fotta et al. |
| 2005/0078681 A1 | 4/2005 | Sanuki et al. |
| 2005/0089018 A1 | 4/2005 | Schessel |
| 2005/0097222 A1 | 5/2005 | Jiang et al. |
| 2005/0105708 A1 | 5/2005 | Kouchri et al. |
| 2005/0141485 A1 | 6/2005 | Miyajima et al. |
| 2005/0152339 A1 | 7/2005 | Scott et al. |
| 2005/0169247 A1 | 8/2005 | Chen |
| 2005/0180549 A1 | 8/2005 | Chiu et al. |
| 2005/0222820 A1 | 10/2005 | Chung |
| 2005/0238034 A1 | 10/2005 | Gillespie et al. |
| 2005/0238142 A1 | 10/2005 | Winegarden |
| 2005/0246174 A1 | 11/2005 | DeGolia |
| 2005/0259637 A1 | 11/2005 | Chu et al. |
| 2005/0282518 A1 | 12/2005 | D'Evelyn et al. |
| 2005/0287979 A1 | 12/2005 | Rollender |
| 2006/0007915 A1 | 1/2006 | Frame |
| 2006/0009240 A1 | 1/2006 | Katz |
| 2006/0013195 A1 | 1/2006 | Son et al. |
| 2006/0059238 A1 | 3/2006 | Slater et al. |
| 2006/0071775 A1 | 4/2006 | Otto et al. |
| 2006/0092011 A1 | 5/2006 | Simon et al. |
| 2006/0114894 A1 | 6/2006 | Cherchali et al. |
| 2006/0140352 A1 | 6/2006 | Morris |
| 2006/0156251 A1 | 7/2006 | Suhail et al. |
| 2006/0167746 A1 | 7/2006 | Zucker |
| 2006/0187898 A1 | 8/2006 | Chou et al. |
| 2006/0187900 A1 | 8/2006 | Akbar et al. |
| 2006/0206933 A1 | 9/2006 | Molen et al. |
| 2006/0243797 A1 | 11/2006 | Apte et al. |
| 2006/0251048 A1 | 11/2006 | Yoshino et al. |
| 2006/0258341 A1 | 11/2006 | Miller et al. |
| 2006/0259767 A1 | 11/2006 | Mansz et al. |
| 2006/0268828 A1 | 11/2006 | Yarlagadda |
| 2006/0268848 A1 | 11/2006 | Larsson et al. |
| 2007/0030161 A1 | 2/2007 | Yang |
| 2007/0032220 A1 | 2/2007 | Feher |
| 2007/0036314 A1 | 2/2007 | Kloberdans et al. |
| 2007/0037560 A1 | 2/2007 | Yun et al. |
| 2007/0037605 A1 | 2/2007 | Logan |
| 2007/0041517 A1 | 2/2007 | Clarke et al. |
| 2007/0049342 A1 | 3/2007 | Mayer et al. |
| 2007/0054645 A1 | 3/2007 | Pan |
| 2007/0061363 A1 | 3/2007 | Ramer et al. |
| 2007/0061735 A1 | 3/2007 | Hoffberg et al. |
| 2007/0067219 A1 | 3/2007 | Altberg et al. |
| 2007/0071212 A1 | 3/2007 | Quittek et al. |
| 2007/0118750 A1 | 5/2007 | Owen et al. |
| 2007/0121593 A1 | 5/2007 | Vance et al. |
| 2007/0121596 A1 | 5/2007 | Kurapati et al. |
| 2007/0132844 A1 | 6/2007 | Katz |
| 2007/0133757 A1 | 6/2007 | Girouard et al. |
| 2007/0135088 A1 | 6/2007 | Alessandro |
| 2007/0153776 A1 | 7/2007 | Joseph et al. |
| 2007/0165811 A1 | 7/2007 | Reumann et al. |
| 2007/0183407 A1 | 8/2007 | Bennett et al. |
| 2007/0203999 A1 | 8/2007 | Townsley et al. |
| 2007/0223455 A1 | 9/2007 | Chang et al. |
| 2007/0238472 A1 | 10/2007 | Wanless |
| 2007/0255702 A1 | 11/2007 | Orme |
| 2007/0283430 A1 | 12/2007 | Lai et al. |
| 2007/0298772 A1 | 12/2007 | Owens et al. |
| 2008/0016556 A1 | 1/2008 | Selignan |
| 2008/0036585 A1 | 2/2008 | Gould |
| 2008/0049748 A1 | 2/2008 | Bugenhagen et al. |
| 2008/0062997 A1 | 3/2008 | Nix |
| 2008/0075248 A1 | 3/2008 | Kim |
| 2008/0075257 A1 | 3/2008 | Nguyen et al. |
| 2008/0084975 A1 | 4/2008 | Schwartz |
| 2008/0089325 A1 | 4/2008 | Sung |
| 2008/0097819 A1 | 4/2008 | Whitman, Jr. |
| 2008/0111765 A1 | 5/2008 | Kim |
| 2008/0118039 A1 | 5/2008 | Elliot et al. |
| 2008/0125095 A1 | 5/2008 | Mornhineway et al. |
| 2008/0125964 A1 | 5/2008 | Carani et al. |
| 2008/0144625 A1 | 6/2008 | Wu et al. |
| 2008/0144884 A1 | 6/2008 | Habibi |
| 2008/0159515 A1 | 7/2008 | Rines |
| 2008/0166992 A1 | 7/2008 | Ricordi et al. |
| 2008/0168145 A1 | 7/2008 | Wilson |
| 2008/0196099 A1 | 8/2008 | Shastri |
| 2008/0200142 A1 | 8/2008 | Abdel-Kader et al. |
| 2008/0205386 A1 | 8/2008 | Purnadi et al. |
| 2008/0225749 A1 | 9/2008 | Peng et al. |
| 2008/0247382 A1 | 10/2008 | Verma et al. |
| 2008/0247401 A1 | 10/2008 | Bhal et al. |
| 2008/0270457 A1 | 10/2008 | Zilbershtein et al. |
| 2008/0293374 A1 | 11/2008 | Berger |
| 2008/0298348 A1 | 12/2008 | Frame et al. |
| 2008/0309486 A1 | 12/2008 | McKenna et al. |
| 2008/0310599 A1 | 12/2008 | Purnadi et al. |
| 2008/0313297 A1 | 12/2008 | Heron et al. |
| 2008/0316946 A1 | 12/2008 | Capper et al. |
| 2009/0097474 A1 | 4/2009 | Ray et al. |
| 2009/0100178 A1 | 4/2009 | Gonzales et al. |
| 2009/0106318 A1 | 4/2009 | Mantripragada et al. |
| 2009/0135008 A1 | 5/2009 | Kirchmeier et al. |
| 2009/0168755 A1 | 7/2009 | Peng et al. |
| 2009/0172131 A1 | 7/2009 | Sullivan |
| 2009/0175165 A1 | 7/2009 | Leighton |
| 2009/0186596 A1 | 7/2009 | Kaltsukis |
| 2009/0213999 A1 | 8/2009 | Farrand et al. |
| 2009/0224931 A1 | 9/2009 | Dietz et al. |
| 2009/0240586 A1 | 9/2009 | Ramer et al. |
| 2009/0253428 A1 | 10/2009 | Bhatia et al. |
| 2009/0261958 A1 | 10/2009 | Sundararajan et al. |
| 2009/0264093 A1 | 10/2009 | Rothschild |
| 2009/0295572 A1 | 12/2009 | Grim, III et al. |
| 2009/0303042 A1 | 12/2009 | Song et al. |
| 2009/0319271 A1 | 12/2009 | Gross |
| 2010/0003960 A1 | 1/2010 | Ray et al. |
| 2010/0034121 A1 | 2/2010 | Bozionek |
| 2010/0046530 A1 | 2/2010 | Hautakorpi et al. |
| 2010/0046731 A1 | 2/2010 | Gisby et al. |
| 2010/0077063 A1 | 3/2010 | Amit et al. |
| 2010/0098034 A1 | 4/2010 | Tang et al. |
| 2010/0098058 A1 | 4/2010 | Delangis |
| 2010/0098235 A1 | 4/2010 | Cadiz et al. |
| 2010/0114896 A1 | 5/2010 | Clark et al. |
| 2010/0136982 A1 | 6/2010 | Zabawskyj et al. |
| 2010/0158223 A1 | 6/2010 | Fang et al. |
| 2010/0191829 A1 | 7/2010 | Cagenius |
| 2010/0195805 A1 | 8/2010 | Zeigler et al. |
| 2010/0215153 A1 | 8/2010 | Ray et al. |
| 2010/0220840 A1 | 9/2010 | Ray et al. |
| 2010/0229452 A1 | 9/2010 | Suk |
| 2010/0246781 A1 | 9/2010 | Bradburn |
| 2010/0261448 A1 | 10/2010 | Peters |
| 2010/0277307 A1 | 11/2010 | Horton et al. |
| 2010/0278173 A1 | 11/2010 | Dalton et al. |
| 2010/0302025 A1 | 12/2010 | Script |
| 2011/0013591 A1 | 1/2011 | Kakumaru |
| 2011/0047031 A1 | 2/2011 | Weerasinghe |
| 2011/0054689 A1 | 3/2011 | Nielsen et al. |
| 2011/0111728 A1 | 5/2011 | Ferguson et al. |
| 2011/0140868 A1 | 6/2011 | Hovang |
| 2011/0151791 A1 | 6/2011 | Snider et al. |
| 2011/0170680 A1 | 7/2011 | Chislett et al. |
| 2011/0183652 A1 | 7/2011 | Eng et al. |
| 2011/0208822 A1 | 8/2011 | Rathod |
| 2011/0265145 A1 | 10/2011 | Prasad et al. |
| 2011/0286462 A1 | 11/2011 | Kompella |
| 2011/0320274 A1 | 12/2011 | Patil |
| 2012/0009904 A1 | 1/2012 | Modi et al. |
| 2012/0010955 A1 | 1/2012 | Ramer et al. |
| 2012/0027191 A1 | 2/2012 | Baril et al. |
| 2012/0035993 A1 | 2/2012 | Nangia |
| 2012/0036576 A1 | 2/2012 | Iyer |
| 2012/0047442 A1 | 2/2012 | Nicolaou et al. |

(56) References Cited

U.S. PATENT DOCUMENTS

| | | |
|---|---|---|
| 2012/0092158 A1 | 4/2012 | Kumbhar et al. |
| 2012/0099716 A1 | 4/2012 | Rae et al. |
| 2012/0166582 A1* | 6/2012 | Binder .................. G06F 21/602 709/217 |
| 2012/0167086 A1* | 6/2012 | Lee ....................... G06F 9/4405 718/1 |
| 2012/0177052 A1* | 7/2012 | Chen ........................ H04W 8/06 370/392 |
| 2012/0178404 A1 | 7/2012 | Chin et al. |
| 2012/0180122 A1 | 7/2012 | Yan et al. |
| 2012/0213094 A1 | 8/2012 | Zhang et al. |
| 2012/0284778 A1 | 11/2012 | Chiou et al. |
| 2012/0320905 A1 | 12/2012 | Ilagan |
| 2012/0329420 A1 | 12/2012 | Zotti et al. |
| 2013/0018509 A1 | 1/2013 | Korus |
| 2013/0024197 A1 | 1/2013 | Jang et al. |
| 2013/0035774 A1 | 2/2013 | Warren et al. |
| 2013/0052982 A1 | 2/2013 | Rohde et al. |
| 2013/0053005 A1 | 2/2013 | Ramer et al. |
| 2013/0070928 A1 | 3/2013 | Ellis et al. |
| 2013/0111589 A1 | 5/2013 | Cho |
| 2013/0136241 A1 | 5/2013 | Dillon et al. |
| 2013/0154822 A1 | 6/2013 | Kumar et al. |
| 2013/0162160 A1 | 6/2013 | Ganton et al. |
| 2013/0162758 A1 | 6/2013 | Shin |
| 2013/0214925 A1 | 8/2013 | Weiss |
| 2013/0229282 A1 | 9/2013 | Brent |
| 2013/0267791 A1 | 10/2013 | Halperin et al. |
| 2013/0272219 A1* | 10/2013 | Singh .................... H04W 16/14 370/329 |
| 2013/0276084 A1* | 10/2013 | Canard ................. H04L 9/3263 726/7 |
| 2013/0288639 A1 | 10/2013 | Varsavsky Waisman-Diamond |
| 2013/0293368 A1 | 11/2013 | Ottah et al. |
| 2013/0336174 A1 | 12/2013 | Rubin et al. |
| 2014/0011470 A1 | 1/2014 | D'Amato et al. |
| 2014/0022915 A1 | 1/2014 | Caron et al. |
| 2014/0038536 A1 | 2/2014 | Welnick et al. |
| 2014/0066063 A1 | 3/2014 | Park |
| 2014/0084165 A1 | 3/2014 | Fadell et al. |
| 2014/0085093 A1 | 3/2014 | Mittleman et al. |
| 2014/0101082 A1 | 4/2014 | Matsuoka et al. |
| 2014/0120863 A1 | 5/2014 | Ferguson et al. |
| 2014/0129942 A1 | 5/2014 | Rathod |
| 2014/0156279 A1 | 6/2014 | Okamoto et al. |
| 2014/0169274 A1 | 6/2014 | Kweon et al. |
| 2014/0172953 A1 | 6/2014 | Blanksteen |
| 2014/0181865 A1 | 6/2014 | Koganei |
| 2014/0199946 A1 | 7/2014 | Flippo et al. |
| 2014/0206279 A1 | 7/2014 | Immendorf et al. |
| 2014/0207929 A1 | 7/2014 | Hoshino et al. |
| 2014/0222436 A1 | 8/2014 | Binder et al. |
| 2014/0253326 A1 | 9/2014 | Cho et al. |
| 2014/0266699 A1 | 9/2014 | Poder et al. |
| 2014/0273912 A1 | 9/2014 | Peh et al. |
| 2014/0273979 A1 | 9/2014 | Van Os et al. |
| 2014/0280870 A1* | 9/2014 | Shrivastava ............ H04L 67/22 709/224 |
| 2014/0306802 A1 | 10/2014 | Hibbs, Jr. |
| 2014/0334645 A1 | 11/2014 | Yun et al. |
| 2014/0358666 A1 | 12/2014 | Baghaie et al. |
| 2015/0065078 A1 | 3/2015 | Mejia et al. |
| 2015/0071450 A1 | 3/2015 | Boyden et al. |
| 2015/0082451 A1 | 3/2015 | Ciancio-Bunch |
| 2015/0086001 A1 | 3/2015 | Farrand et al. |
| 2015/0087280 A1 | 3/2015 | Farrand et al. |
| 2015/0089032 A1 | 3/2015 | Agarwal et al. |
| 2015/0100167 A1 | 4/2015 | Sloo et al. |
| 2015/0117624 A1 | 4/2015 | Rosenshine |
| 2015/0138333 A1 | 5/2015 | DeVaul et al. |
| 2015/0145693 A1 | 5/2015 | Toriumi et al. |
| 2015/0177114 A1 | 6/2015 | Kapoor et al. |
| 2015/0200973 A1 | 7/2015 | Nolan |
| 2015/0221207 A1 | 8/2015 | Hagan |
| 2015/0229770 A1 | 8/2015 | Shuman et al. |
| 2015/0242932 A1 | 8/2015 | Beguin et al. |
| 2015/0244873 A1 | 8/2015 | Boyden et al. |
| 2015/0255071 A1 | 9/2015 | Chiba |
| 2015/0262435 A1 | 9/2015 | Delong et al. |
| 2015/0281450 A1 | 10/2015 | Shapiro et al. |
| 2015/0302725 A1 | 10/2015 | Sager et al. |
| 2015/0327039 A1 | 11/2015 | Jain |
| 2015/0334227 A1 | 11/2015 | Whitten et al. |
| 2015/0339912 A1 | 11/2015 | Farrand et al. |
| 2015/0358795 A1 | 12/2015 | You et al. |
| 2015/0379562 A1 | 12/2015 | Spievak et al. |
| 2015/0381563 A1* | 12/2015 | Seo ..................... H04L 12/6418 370/401 |
| 2016/0006837 A1* | 1/2016 | Reynolds ............... H04W 84/18 709/203 |
| 2016/0012702 A1 | 1/2016 | Hart et al. |
| 2016/0036751 A1 | 2/2016 | Ban |
| 2016/0036962 A1 | 2/2016 | Rand |
| 2016/0066011 A1 | 3/2016 | Ro et al. |
| 2016/0078750 A1 | 3/2016 | King et al. |
| 2016/0117684 A1 | 4/2016 | Khor et al. |
| 2016/0142758 A1 | 5/2016 | Karp et al. |
| 2016/0150024 A1 | 5/2016 | White |
| 2016/0173693 A1 | 6/2016 | Spievak et al. |
| 2016/0219150 A1 | 7/2016 | Brown |
| 2016/0232774 A1 | 8/2016 | Noland et al. |
| 2016/0248847 A1 | 8/2016 | Saxena et al. |
| 2016/0269882 A1 | 9/2016 | Balthasar et al. |
| 2016/0277573 A1 | 9/2016 | Farrand et al. |
| 2016/0300260 A1 | 10/2016 | Cigich et al. |
| 2016/0315909 A1 | 10/2016 | von Gravrock et al. |
| 2016/0323446 A1 | 11/2016 | Farrand et al. |
| 2016/0330069 A1 | 11/2016 | Nordmark et al. |
| 2016/0330108 A1 | 11/2016 | Gillon et al. |
| 2016/0330319 A1 | 11/2016 | Farrand et al. |
| 2016/0330770 A1 | 11/2016 | Lee et al. |
| 2016/0373372 A1 | 12/2016 | Gillon et al. |
| 2017/0021802 A1 | 1/2017 | Mims |
| 2017/0024995 A1 | 1/2017 | Gu et al. |
| 2017/0034044 A1 | 2/2017 | Gillon et al. |
| 2017/0034045 A1 | 2/2017 | Gillon et al. |
| 2017/0034062 A1 | 2/2017 | Gillon et al. |
| 2017/0034081 A1 | 2/2017 | Gillon et al. |
| 2017/0084164 A1 | 3/2017 | Farrand et al. |
| 2017/0104875 A1 | 4/2017 | Im et al. |
| 2017/0188216 A1 | 6/2017 | Koskas et al. |
| 2017/0270569 A1 | 9/2017 | Altberg et al. |
| 2017/0272316 A1* | 9/2017 | Johnson ................ H04L 61/301 |
| 2017/0293301 A1 | 10/2017 | Myslinski |
| 2017/0339228 A1 | 11/2017 | Azgin et al. |
| 2018/0005125 A1 | 1/2018 | Fadell et al. |
| 2018/0061213 A1 | 3/2018 | Morehead |
| 2018/0075540 A1 | 3/2018 | Bernard et al. |
| 2018/0152557 A1 | 5/2018 | White et al. |
| 2018/0182389 A1 | 6/2018 | Devaraj et al. |
| 2018/0302334 A1 | 10/2018 | Osterlund et al. |
| 2018/0324105 A1 | 11/2018 | Gillon et al. |
| 2018/0365026 A1 | 12/2018 | Jernigan et al. |
| 2018/0365969 A1 | 12/2018 | Krein et al. |
| 2018/0375927 A1 | 12/2018 | Nozawa |
| 2019/0014024 A1* | 1/2019 | Koshy ..................... H04L 43/08 |
| 2019/0044641 A1 | 2/2019 | Trundle et al. |
| 2019/0045058 A1 | 2/2019 | Im et al. |
| 2019/0052752 A1 | 2/2019 | Farrand et al. |
| 2019/0190942 A1 | 6/2019 | Drummond et al. |
| 2019/0206227 A1 | 7/2019 | Farrand et al. |
| 2019/0222993 A1 | 7/2019 | Maheshwari et al. |
| 2019/0385435 A1 | 12/2019 | Farrand et al. |
| 2020/0004989 A1* | 1/2020 | Lockhart, III ......... G06F 21/6263 |
| 2020/0105082 A1 | 4/2020 | Joao |
| 2020/0126388 A1 | 4/2020 | Kranz |
| 2020/0143663 A1 | 5/2020 | Sol |
| 2020/0168073 A1 | 5/2020 | Hart et al. |
| 2020/0186644 A1 | 6/2020 | White et al. |

(56) References Cited

U.S. PATENT DOCUMENTS

| | | |
|---|---|---|
| 2020/0219378 A1 | 7/2020 | Farrand et al. |
| 2020/0380851 A1 | 12/2020 | Farrand et al. |

FOREIGN PATENT DOCUMENTS

| | | |
|---|---|---|
| EP | 2187574 A1 | 5/2010 |
| EP | 3050287 | 8/2016 |
| EP | 3146516 | 3/2017 |
| EP | 3167340 | 5/2017 |
| EP | 3295620 | 3/2018 |
| EP | 3050287 B1 | 12/2018 |
| EP | 3585011 A1 | 12/2019 |
| WO | WO2015041738 | 3/2015 |
| WO | WO2015179120 | 11/2015 |
| WO | WO2016007244 | 1/2016 |
| WO | WO2016182796 | 11/2016 |
| WO | WO2018044657 | 3/2018 |

OTHER PUBLICATIONS

"International Search Report" and "Written Opinion of the International Searching Authority," dated Jul. 27, 2015 for App. No. PCT/US2015/029109, filed May 4, 2015, 12 pages.

"International Search Report" and "Written Opinion of the International Searching Authority," dated Nov. 2, 2015 for App. No. PCT/US2015/034054, filed Jun. 3, 2015, 15 pages.

Life Alert. "Life Alert's Four Layers of Protection, First Layer of Protection: Protection at Home." https://web.archive.org/web/20121127094247/http://www.lifealert.net/products/homeprotection.html. [retrieved Oct. 13, 2015], 4 pages.

"International Search Report" and "Written Opinion of the International Searching Authority," dated Jun. 30, 2016 for App. No. PCT/US2016/030597, filed May 3, 2016, 12 pages.

"Extended European Search Report," European Patent Application No. 14845956.3, dated Feb. 16, 2017, 8 pages.

"Office Action," Canadian Patent Application No. 2949211, dated Aug. 16, 2017, 4 pages.

"Office Action," Canadian Patent Application No. 2954351, dated Oct. 27, 2017, 3 pages.

"International Search Report" and "Written Opinion of the International Searching Authority," Patent Cooperation Treaty Application No. PCT/US2017/048284, dated Nov. 8, 2017, 8 pages.

"Extended European Search Report," European Patent Application No. 15796148.3, dated Jan. 8, 2018, 8 pages.

"Office Action," European Patent Application No. 14845956.3, dated Apr. 9, 2018, 4 pages.

"Extended European Search Report," European Patent Application No. 15818258.4, dated Feb. 26, 2018, 8 pages.

"Notice of Allowance," European Patent Application No. 14845956.3, dated Jul. 11, 2018, 7 pages.

Osterlund, Karl et al., "Communications Network Failure Detection and Remediation," U.S. Appl. No. 16/011,479, filed Jun. 18, 2018, Specification, Claims, Abstract, and Drawings, 92 pages.

"Notice of Allowance", Canadian Patent Application No. 2949211, dated Jul. 31, 2018, 1 page.

"Office Action," Canadian Patent Application No. 2954351, dated Aug. 22, 2018, 4 pages.

"Partial Supplementary European Search Report," European Patent Application No. 16793194.8, dated Nov. 19, 2018, 10 pages.

"Extended European Search Report," European Patent Application No. 16793194.8, dated Feb. 26, 2019, 9 pages.

"Office Action," European Patent Application No. 16793194.8, dated Jun. 9, 2020, 4 pages.

"Extended European Search Report," European Patent Application No. 19187593.9, dated Nov. 13, 2019, 8 pages.

Takahashi et al. "A Hybrid FEC Method Using Packet-Level Convolution and Reed-Solomon Codes," IEICE Transaction on Communications, Communications Society, vol. E89-B, No. 8, Aug. 1, 2006. pp. 2143-2151.

"Notice of Allowance", Canadian Patent Application No. 2954351, dated Aug. 27, 2019, 1 page.

"Office Action," European Patent Application No. 15796148.3, dated Jan. 29, 2020, 6 pages.

"Office Action," European Patent Application No. 15818258.4, dated Jan. 31, 2020, 5 pages.

"Office Action", European Patent Application No. 15796148.3, dated Dec. 8, 2020, 4 pages.

Christensen et al., "Voice-enabled IT transformation the new voice technologies",IBM Systems Journal, vol. 46, No. 4, 2007, 13 pages.

Das et al., "An automated speech-language therapy tool with interactive virtual agent and peer-to-peer feedback", IEEE, 2017, 6 pages.

Iannizzotto et al., "A Vision and Speech Enabled, Customizable, Virtual Assistant for Smart Environments", IEEE, 2018, 7 pages.

"Increased usability with virtual assistants by storing original audio when confidence is below a threshold level", IP.com, Jan. 13, 2020, 3 pages.

Michaud, "Observations of a New Chatbot Drawing Conclusions from Early Interactions with Users", IEEE Computer Society, 2018, 8 pages.

Rogoff, "Voice activated GUI—the next user interface", IEEE, 2001, 4 pages.

Zhang et al., "Dangerous Skills Understanding and Mitigating Security Risks of Voice-Controlled Third-Party Functions on Virtual Personal Assistant Systems", IEEE Symposium on Security and Privacy, 2019, 16 pages.

"Office Action", European Patent Application No. 15818258.4, dated Feb. 10, 2021, 4 pages.

\* cited by examiner

COMMUNICATIONS HUB

CROSS REFERENCE TO RELATED APPLICATIONS

This application is a continuation of U.S. patent application Ser. No. 15/251,977, filed Aug. 30, 2016 and issued Jun. 26, 2018 as U.S. Pat. No. 10,009,286, which is a continuation-in-part of U.S. patent application Ser. No. 14/708,132, filed May 8, 2015 and issued Dec. 13, 2016, as U.S. Pat. No. 9,521,069, the disclosures of which are incorporated by reference for all purposes.

TECHNICAL FIELD

The present technology relates generally wired and wireless broadband communications, and more specifically to managing multiple wired and wireless broadband communications channels.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Data bandwidth provided by a hardwired broadband Internet connection to a home or small office is finite and divided among competing applications and computing devices. While Internet traffic is handled on a "best effort" basis, current multimedia traffic (e.g., video, voice, and the like) cannot tolerate increasing lost or delayed data before the user experience is degraded. Some home and small office routers can be configured to assign a priority to each device and/or service operating on the home or small office network and control the amount of bandwidth each is allowed to consume. In this way, the computer network performance (perceived by the user), referred to as quality of service (QoS), is managed. If the data loss or data delay occurs outside of the home or small office network (e.g., in an Internet service provider's (ISP's) network, an upstream ISP's network, and the like), then conventionally managing QoS at the home and small office router as described above has limited effect.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various techniques for bandwidth sharing. Specifically, a method for may comprise getting a list of neighboring communications hubs, the neighboring communications hubs being disposed in respective neighboring residences, the neighboring communications hubs being communicatively coupled to the first communications hub using a first broadband data network provisioned by an Internet Service Provider (ISP), the neighboring residences being at least one of within a same predetermined geographic region as the first residence and within a predetermined temporal distance on a data network from the first residence; determining a data requirement exceeds bandwidth available to the first communications hub; providing a request for data to a neighboring communications hub of the neighboring communications hubs, the request corresponding to the data requirement; and receiving data responsive to the request from the neighboring communications hub.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium.

Figure 1:
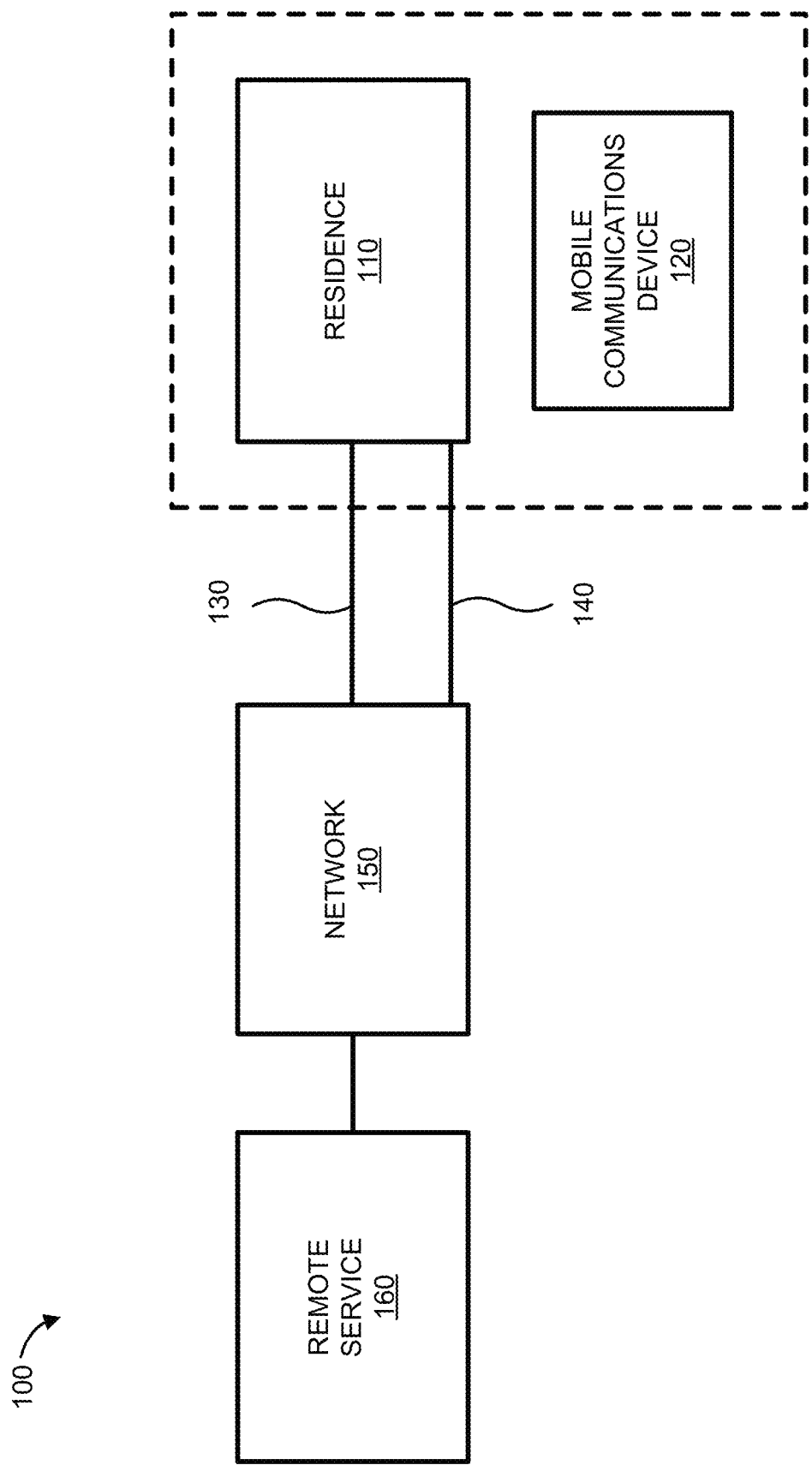
FIG. 1 is a simplified block diagram of communications to an about a residence, according to some embodiments.

FIG. 1 shows a communications environment 100 according to some embodiments. Communications environment 100 can include a structure 110, mobile communications device 120, primary communications channel (or network) 130, secondary communications channel (or network) 140, network 150, and services 160.

Structure 110 is a structure in which a person or persons live (e.g., end user), according to various embodiments. By way of non-limiting example, structure 110 is single- or multi-unit housing, such as a mansion, house, duplex, triplex, apartment, condominium, townhouse, dormitory, and the like. In some embodiments, structure 110 is a small office/home office (e.g., business having 1-10 employees) in a residential or commercial structure or building. In various embodiments, structure 110 is a medium to large size office (e.g., business having greater than 10 employees) in a commercial structure or building.

In accordance with various embodiments, mobile communications device 120 is communications device using wireless communications. By way of non-limiting example, mobile communications device 120 is a smart phone, phablet computer, tablet computer, notebook computer, wearable technology, other wireless computing device, and the like. By way of further non-limiting example, mobile communications device 120 is a motor vehicle including a computing device and using wireless communications. (Wireless) Computing devices are described further in relation to FIG. 11. Wireless communications can include technology that allows electronic devices to connect to a wireless local area network (WLAN) network (e.g., Wi-Fi), mobile broadband (e.g., CDMA2000, Enhanced Data rates for GSM Evolution (EDGE), Long-Term Evolution (LTE), etc.), and the like.

Mobile communications device 120 can be within or about structure 110. For example, mobile communications device can be on the premises of structure 110 (e.g., within a property line), nearby on a (public) street or sidewalk immediately adjoining structure 110, and within 1-30 meters of structure 110.

In some embodiments, primary communications channel (or network) 130 is a packet-switched data network, in which information is broken into small blocks of information, or packets, to be sent to across the network. For example, the primary network could be a wired connection to the public Internet (e.g., cable, DSL, fiber, etc.), wireless connection to the public Internet (e.g., WiMAX and the like), and any type of public or private data network over wired or wireless access media. By way of non-limiting example, the primary network can be: leased T-carrier line; Synchronous Optical Networking (SONET); Synchronous Digital Hierarchy (SDH); cable internet access; Digital Subscriber Line (DSL); Fiber-to-the-home (FTTH); Broadband over power lines (BPL); WiFi (e.g., based on Institute of Electrical and Electronics Engineers' (IEEE) 802.11 standard); Global System for Mobile Communications (GSM) Circuit Switched Data (CSD), General packet radio service (GPRS), and Enhanced Data rates for GSM Evolution (EDGE); Cellular Digital Packet Data (CDPD); Wideband Code Division Multiple Access (WCDMA); High Speed Packet Access (HSPA); Universal Mobile Telecommunications System (UMTS)—time-division duplexing (TDD); CDMA2000; Evolved High-Speed Packet Access (HSPA+); Worldwide Interoperability for Microwave Access (WiMAX); Long-Term Evolution (4G LTE); LTE Advanced; Mobile Broadband Wireless Access (MBWA); satellite broadband; and the like.

In various embodiments, secondary communications channel (or network) 140 is physically independent from primary communications channel 130. For example, secondary communications channel 140 is a secondary wireless network from a mobile provider (e.g., 4G, WiMAX, etc.), a second broadband connection (e.g., cable, DSL, fiber, WiMAX, etc.), and a connection through another connected consumer device in or adjacent to structure 110, such as mobile communications device 120.

Network 150 can be various permutations and combinations of a campus area network, metropolitan area network, wide area network, and the Internet. In some embodiments, services 160 include an application and/or service provided by an application server (e.g., web app), game server (e.g., multiplayer game), mail server, media server (e.g., digital audio and/or video), web server (e.g., web pages), and the like.

Figure 2:
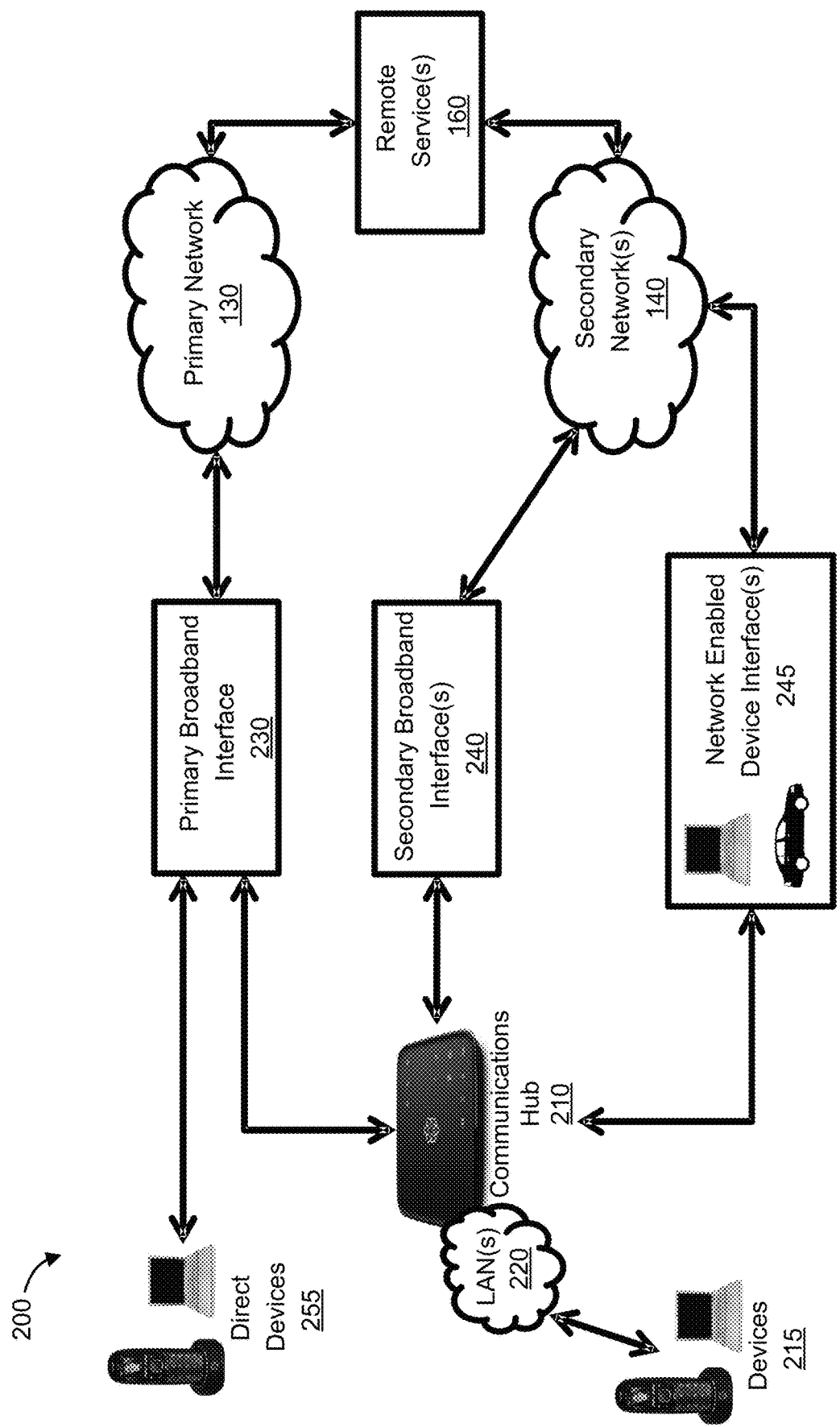
FIG. 2 is a simplified block diagram of communications to a communications hub, according to various embodiments.

FIG. 2 illustrates a simplified block diagram 200 of a network including communications hub 210. In some embodiments, communications hub 210 performs multiple functions/operations, including as a network router and firewall for a home or small office. As depicted in FIG. 2, communications hub 210 provides network services (from services 160) to one or more devices 215 connected to communications hub 210, through local area network (LAN) 220. For example, device 215 can include a computer, tablet computer, consumer entertainment device, mobile phone, digital enhanced cordless telecommunications (DECT) phone, wired telephone handset, and other network enabled device. For example, LAN 220 includes wired IP networks (e.g., Ethernet) and wireless (Wi-Fi) IP Networks (e.g., 802.11x, 3G, 4G, 5G, etc.), and networks facilitated by other technology and protocols. Additionally or alternatively, device 215 may be connected directly (e.g., analog telephones connected via FXS ports), or using other interface protocols (e.g., USB, Firewire, Bluetooth, DECT, NFC, ZigBee, ZWave, and the like).

As shown in FIG. 2, communications hub 210 can be connected to primary network 130, using primary broadband interface 230. In some embodiments, primary network 130 is a cable, DSL, fiber, broadband network, and primary broadband interface 230 is a modem or other interface device used to access the primary network 130. Primary broadband interface 230 may be a standalone piece of equipment to which communications hub 210 is connected, or may be integrated in communications hub 210. In various embodiments, primary network 130 can additionally or alternatively be another physical carrier technology (wired or wireless) to access the Internet.

As illustrated in FIG. 2, secondary network 140 can be accessed using secondary broadband interface 240. For example, secondary network 140 is a secondary cable, DSL, or fiber network, accessed via a cable modem or similar device. Additionally or alternatively, secondary network 140 may be a different wired or wireless service such as a 3G, 4G, or 5G connection, WiMAX, IP over powerline, satellite Internet, or other connection mechanism. Secondary broadband interface 240 is the modem or other interface device used to access the secondary network 140. Secondary broadband interface 240 may be a standalone piece of equipment to which communications hub 210 is connected, or may be an integrated component of communications hub 210.

Communications hub 210 may alternatively or additionally access secondary network 140 via network enabled device interface 245. In some embodiments, network enabled device interface 245 communicates with mobile communications device 120 (FIG. 1). For example, a cellular telephone may be able to provide "hot spot" capabilities, which communications hub 210 may use to access secondary network 140. By way of further example, network enabled device interface 245 could include network services provided by a vehicle, connections via an alarm system connected to the outside world, via gaming or entertainment devices providing their own networks, and the like.

Device 215 and communications hub 210 can communicate with (one or more) remote service 160 using primary network 130 (e.g., via primary broadband interface 230) and/or secondary network 140 (e.g., via Secondary Broadband Interface 240 and/or network enabled device interface 245. Remote service 160 can include communications services (e.g., voice, video, etc.), entertainment services, security services, home automation services, and the like.

Secondary network 140 may be used when primary network 130 is unavailable or is performing at a level where one or more criteria (e.g., delay, bandwidth, packet loss, latency, and the like) has fallen outside of a respective pre-determined range. In this way, the secondary network 140 may be used to provide service in situations where service may otherwise not be available (in other words, to provide reliability), or primary network 130 and secondary network 140 may be combined to improve performance by load balancing traffic, combining traffic, or other techniques. This may include elements and techniques from the Internet Engineering Task Force (IETF) work on Multipath TCP and similar work.

By way of non-limiting example, a cable modem provides 200 Mbps of bandwidth. Using one or more measurement mechanisms (e.g., passive traffic measurement, active probes, and the like) the bandwidth to a number of sites known to typically provide high bandwidth connections is observed to be far below theoretical possible bandwidth (e.g., if only 20 Mbps of bandwidth is observed and previously higher performance was observed), use of the secondary network may be triggered. In other words, the preceding observed change is an example condition for using (switching to) the secondary network. By way of further example, if the round trip time for packets to known hosts on a particular network is typically around 50 ms, but is observed to (suddenly) be 200 ms or greater, this may trigger use of the secondary network. That is, the preceding observed change may be another example condition for using (switching to) the secondary network.

In some embodiments, at least one of communications hub 210 primary broadband interface 230, secondary broadband interface 240, and network enabled device interface 245 include supplemental or reserve electrical power, for example, a backup battery. Particularly in the case of secondary network 140, back-up electrical power allows device 215 to continue to function/operate during loss of electrical power and/or connectivity to the primary network. As an example, secondary network 140 is a cellular network, and communications hub 210 is equipped with a cellular modem to allow access to this network, as well as a back-up battery. Device 215 (e.g., equipped with its own power source and/or powered by connections provided by communications hub 210, for example, USB or power created via an inverter) would be able to connect to the Internet, even if the power to communications hub 210 and primary network 130 (e.g., a cable modem) are non-functional (e.g., off due to lack of electricity).

In various embodiments, a provider of remote service 160 sells/leases (and in some cases manufactures) communications hub 210 to end users. Communications hub 210 facilitates delivery of the provider's communications service (e.g., of remote service 160), but as discussed below, communications hub 210 may also provide numerous other services (e.g., of remote service 160) to the end user.

In some embodiments, communications hub 210 provides network services via LAN 220 to device 215, and also provides additional network capabilities to the device 215, such as firewall protection, dynamic host configuration protocol (DHCP) services, network address translation (NAT) traversal capabilities, virtual private network (VPN) capabilities, and the like. In this way, communications hub 210 performs many of the functions of a home router and/or network appliance for device 215.

When primary broadband interface 230 is not integrated into communications hub 210, some devices (e.g., direct device 255 in FIG. 2) may connect to primary network 130 in a way that circumvents communications hub 210. In such circumstances, direct device 255 may not have access to all of the functions provided by communications hub 210.

Figure 3:
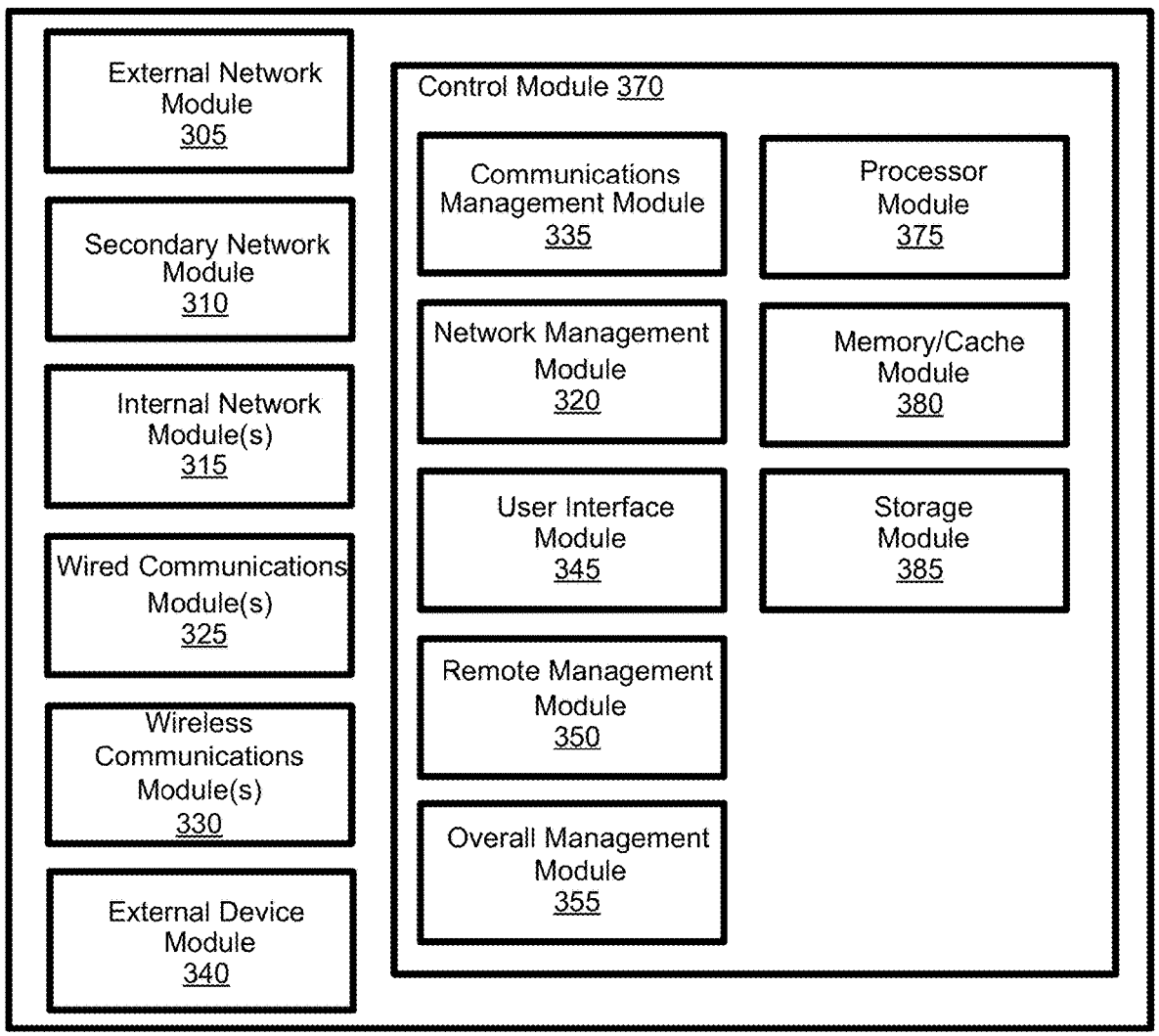
FIG. 3 is a simplified block diagram of a communications hub, in accordance with some embodiments.

In some embodiments, communications hub 210 is provisioned by a communications service provider. Communications hub 210 can perform the functions/operations of a home router/firewall/Wi-Fi access point, as well as support a communications service (e.g., of remote service 160) of the communications service provider. FIG. 3 depicts a simplified block diagram 300 of communications hub 210, including various components.

External network module 305 can connect to the end customer's broadband network (e.g., primary network 130) via a broadband modem (e.g., primary broadband interface 230) over wired Ethernet. External network module 305 can include a wired Ethernet connector, as well as the hardware, firmware, and software to support the connection, but this could also be any other type of network interface allowing for access to different types of networks, and could also incorporate the capabilities of primary broadband interface 230 internally, eliminating the need for an external device.

Secondary network module 310 can connect to a secondary broadband network (e.g., secondary network 140). For example, secondary broadband interface 240 is a 4G network radio, as well as the hardware, firmware, and software to support the connection, but this could also be any other type of network interface allowing for access to different types of networks. Additionally or alternatively, secondary network module 310 can use secondary broadband interface 240 or network enabled device interface 245 to connect to secondary network 140.

Internal network module 315 enables LAN 220 for the end customer's network. In some embodiments, internal network module 315 includes two modules, one providing a number of wired Ethernet connectors and a second providing a Wi-Fi radio. These modules include the hardware, firmware, and software to support the connection, and could also use other hardware or software standards to deliver a LAN to device 215.

Network management module 320 can work in concert with at least one of external network module 305, secondary network module 310, and internal network module 315, to provide (by communications hub 210) the functions of a network router/firewall device, such as NAT capabilities, firewall capabilities, DHCP server, port filter/forwarding, security components, Ethernet switch capabilities, router capabilities, Wi-Fi access point capabilities, and other functions needed to connect to the end customer's broadband network and provide a firewalled, NAT-ed LAN to the end customer.

Wired communications module 325 controls wired (e.g., analog and/or digital, voice and/or video, etc.) communications connections, including FXS and FXO ports. In this exemplary implementation, wired communications module 325 includes one or more FXS ports, allowing consumers to connect analog telephones, household wiring supporting analog telephones, TTY devices, facsimile (FAX) machines, and the like.

Wireless communication module 330 provides support for wireless communications devices, such as appropriate radio systems, as well as the hardware, firmware, and software to support them. In some embodiments, wireless communication modules 330 include a DECT radio, allowing connections of DECT communications devices, for example handsets, speaker phones, and headsets; and a Bluetooth radio, allowing connection of Bluetooth communications devices, for example handsets, speaker phones, and headsets. Wireless communication module 330 optionally includes radios for such wireless communications as Zwave, Zigbee Bluetooth Low Energy, Industrial, Scientific and Medical band (ISM) connections, and the like.

Communications management module 335 works in concert with at least one of wired communications module 325 and wireless communications module 330, to perform (by communications hub 210 in concert with equipment associated with remote service 160) the functions of a communications system, such as call control capabilities, call screening capabilities, presentation of caller ID information, facsimile (FAX) capabilities, and other functions needed to facilitate communications services for the end customer.

External device module 340 provides support to connect devices, other than the network or communications devices described above, to communications hub 210. In some embodiments, connections include USB (e.g., USB 2.0, USB 3.0, USB C, etc.); Firewire; video and audio connections (e.g., HDMI, DVI, component, VGA, composite, analog and digital audio, etc.); low power network connections for connecting devices (e.g., rather than network connectivity), such as Bluetooth; PCMCIA cards; mass storage devices (e.g. CF cards, XD cards, SD cards, MMC cards, etc.); and the like.

User interface module 345 receives input and output from the end user for interaction with communications hub 210. For example, user interface module 345 includes lights, buttons, screens, touch screens, knobs, dials, and other physical controls on communications hub 210, as well as software based control, for example, via an internal web server or connection to a smartphone application. In some embodiments, user interface module 345 includes simple buttons and lights indicating status, allowing DECT or Bluetooth devices to be paired, reset the device, etc.; as well as providing a web management interface available from LAN 220. Additionally or alternatively, remote management via smartphone or web interface (e.g., via remote service 160) is also provided, although this may be via remote management module 350.

Remote management module 350 provides software access to the remote service 160 to manage (and in some cases leverage for other purposes) communications hub 210. This access occurs over either the external network module 305 or the secondary network module 310. This allows for remote management, either by the end user while not able to connect over the LAN 220, or by personnel of the remote service 160. Overall management module 355 includes hardware, firmware, and software enabling coordination of all the other modules of the system.

Control module 370 includes at least some management modules described above (e.g., communications management module 335, network management module 320, user interface module 345, remote management module 350, and overall management module 355), as well as supporting hardware. Supporting hardware can include processor module 375 (e.g., including one or more CPUs and their supporting hardware and firmware), memory/cache module 380 (e.g., with supporting hardware and firmware), and storage module 385, including of storage (e.g., disk, flash, or other, with supporting hardware and firmware). In some embodiments, one or more CPUs, memory and cache, and flash storage are provided. While the various management modules are logically separate, they may use processor module 375, memory/cache module 380, and storage module 385 to execute their functions, may include their own hardware and firmware, or some combination thereof.

In various embodiments, end users acquire communications hub 210 from a communications service provider associated with a communications service (e.g., of remote service 160), by purchasing, leasing (as part of a service contract), or are provided communications hub 210 free of charge because of other economic relationships or because remote service 160 obtains value from the use of communications hub 210 by the end customer, for example, through the collection of useful data.

Figure 4:
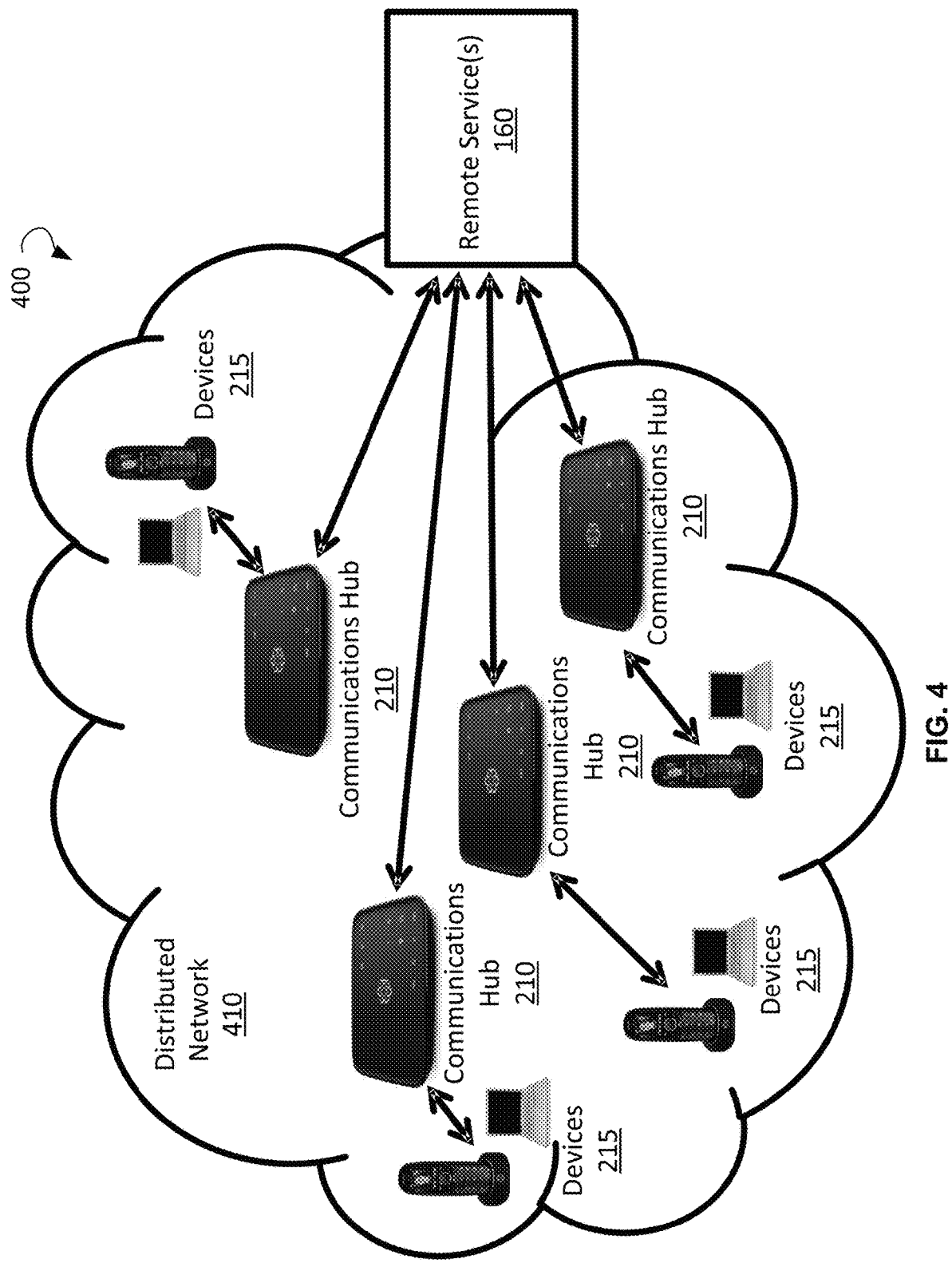
FIG. 4 is a simplified block diagram illustrating a network of communications hubs, in accordance with various embodiments.

FIG. 4 shows a simplified block diagram 400 depicting distributed network 410. The network includes a number—potentially a very large (e.g., on the order of hundreds to millions)—of communications hub 210, each disposed in, on, or about a respective structure 110 (and end user; FIG. 1). Each structure 110 (and end user) has one or more of device 215 communicating with a respective communications hub 210. As described above, each communications hub 210 can be connected to network 150 (FIG. 1) through primary network 130 and/or secondary network 140. Each communications hub 210 can use a respective primary network 130 and/or secondary network 140 to connect with and communicate with remote service 160, providing services to a respective end user at respective structure 110, as well as creating value for remote service 160, for example, though access to the information generated by the end users through the use of communications hub 210.

In some embodiments, remote service 160 is a communications service provided by a communications service provider. Communications hub 210 device can work in concert with remote service 160 to deliver communications services to the end user (or customer). Additionally or alternatively as described above, communications hub 210 can serve as a network device for the end customer, providing firewall, NAT, DHCP, and other network services to the end customer. In some embodiments, there are several unique capabilities providing benefits to both the end customers and to remote service 160.

In addition to providing communications services, the communications service provider can control and operate distributed network 410. When the communications service provider designs (and/or manufactures) consumer devices (e.g., communications hub 210) and/or provides a service running on such devices (e.g., entertainment, education, security, home automation, etc.), the consumer devices can form distributed network 410. When the communications service provider is also a carrier or service provider (e.g., for services other than delivering communications sessions as described above), for example, delivering broadband services, cable services, wireless services, alarm service, home automation service, or other similar services, the consumer devices used to provide access to such a service (e.g., routers, modems, access devices, alarm systems, home automation systems, etc.) can be communications hub 210, and can form distributed network 410.

As would be readily appreciated by one of ordinary skill in the art, there are different ways remote service 160, through an additional line of business or business relationship, could access distributed network 410 in other ways. For example, when remote service 160 does not have direct access to distributed network 410 (e.g., including multiple of communications hub 210), similar capabilities/benefits can realized by leasing access from others with direct access to distributed network 410, etc.

In various embodiments, a substantial amount of end user Internet data traverses communications hub 210, so extensive additional information about the end users may be collected. This includes all calls placed; Internet locations visited or accessed (e.g., web pages); consumer entertainment preferences; personal behavior characteristics (e.g., times of day active, times of day at home), and the like.

When distributed network 410 comprises a large number (e.g., hundreds to millions) of communications hub 210, the plurality of communications hub 210 can be well distributed, in terms of both geography and network topology (connectivity). That is, the plurality of communications hub 210 can be in individual end user's homes or businesses, located in many locations throughout a country or the world, and connected to many different Internet service providers (ISPs) connected to the Internet in different ways, and from many locations. As a result, remote service 160 can select or group two or more of communications hub 210 (e.g., groups or subsets of communications hub 210 comprising distributed network 410) based on various criteria. In some embodiments, communications hub 210 being well distributed can be as important (if not more important) than the quantity of communications hub 210. For example, a thousand of communications hub 210 concentrated in one place (e.g., the same building) is less effective than a hundred of communications hub 210 distributed around the world.

For example, remote service 160 finds one or more particular ones of communications hub 210 that share a particular property. The property may include a geographical location; time zone; zip code; area code; ISP serving primary network 130 or secondary network 140; demographic information associated with the geographic area; or some other desirable property of communications hub 210.

Additionally or alternatively, ones of communications hub 210 may be identified or grouped into collections (e.g., groups or subsets of communications hub 210 that comprise distributed network 410) based on certain properties relative to each other or to other network locations. For example, ones of communications hub 210 are selected to find those that are a topological (network) distance to a selected host (e.g., finding ones of communications hub 210 topologically "near" to server(s) used by a particular company or organization); have low latency or low round trip/ping time (e.g., time to send a receive a reply to a small network message) when connecting to a selected host.

By way of non-limiting example, some embodiments—where all communications hub 210 have round trip times of 1 ms or less between each other (and/or with respect to a particular host)—may be in close physical proximity. Communications hub 210 with single digit round trip times between each other (and/or with respect a particular host) may be topologically (and/or geographically) close for contemporary consumer and small or medium business connections. Ones of communications hub 210—having high bandwidth to a selected host—may also be selected. For embodiments in home, small, and medium offices, measurements showing consistent throughput of greater than or equal to 100 Mbps would indicate a good, high bandwidth connection. Ones of communications hubs 210 could also be selected that are geographically near selected other communications hubs 210 or hosts (e.g., in the same neighborhood, town/city, metropolitan area, state/province, etc., as may be needed); are located in the same country as selected hosts; are served by the same ISP as the selected host; have a minimum number of network hops (for example, show 6 or less hops, indicating a very topologically near network connection, or 10 or less hops, indicating an average to above-average nearness on contemporary networks) to the selected host; that optimize other desirable properties relative to the desired host; and/or the like.

In some embodiments, the relationship between a certain one of communications hub 210 and a particular host of interest may be directly determined, for example, determining communications hub 210 is in a particular country. Alternatively or additionally, the relationship may be determined by remote service 160 by periodically and/or as needed instructing a selected one of communications hub 210 to take network measurements, performed by sending network pings; executing traceroute commands; performing active file transfers to measure bandwidth; using passive network measurement techniques; using network topology discovery protocols (e.g., link layer discovery protocol (LLDP) or Cisco discovery protocol (CDP)); or other mechanisms.

In various embodiments, a periodicity of the measurements is a function of the relationship measured. For example, determining an average speed of users in a particular geographic region, such as a country, can be performed by taking measurements a couple of times per week. By way of further example, determining the top ten "best" ones of communications hub 210 relative to another of communications hub 210 for use as a real-time media relay, measurements between the hubs can be performed hourly or even more frequently to ensure transient network phenomena are considered. According to some embodiments, measurements are not needed when the relationship may be determined a priori (e.g., identifying a host in a particular country). Measurement can be used when the relationship is quantifiable (e.g., determining a communications hub 210 with good connectivity to a particular server uses measurements (e.g., lower hop counts, lower RTT, or higher bandwidth than the result of similar measurements by other communications hubs 210), because the relationship is less a function of geography than of network topology.

As an example, to identify one or more communications hubs 210 that have a very low latency or very high bandwidth connection(s) to a particular server of interest (e.g., web server, media server, email server), etc., such as by locating the hub that is best positioned to most rapidly download a large file and then share it with other devices. By periodically asking ones of communications hub 210 to take measurements for servers/hosts of interest, and periodically asking that these measurements be repeated, remote service 160 can maintain a list of ones of communications hub 210 with the desired properties relative to the hosts of interest based on the measurements collected between hosts.

Additionally or alternatively, remote service 160 use the mechanisms described above to identify "nearness" (e.g., spatial and/or network proximity) of one of communications hub 210 to others of communications hub 210. Network proximity and temporal proximity refers to a distance in time (e.g., latency). Similar to the methodologies described above to determine "nearness," the determination can be made by instructing ones of communications hub 210 to periodically perform network tests to another randomly selected one of communications hub 210. Others of communications hub 210 that are found to have good results will be considered "near" (e.g., spatially and/or temporally proximity) to one another, potentially grouped as a subset that are "near" to one another for the selected property (e.g., latency, topological distance, or any of the other properties discussed above). Periodically, ones of communications hub 210 can be instructed to retest targets which previously tested poorly, to determine if anything has changed. As above, in some cases relationships may also be identified without measurements (e.g., grouping devices configured as being in a particular geographical area, having a certain area code, and the like). Using various combinations and permutations of the techniques described above, remote service 160 can maintain subsets of communications hub 210 in distributed network 410 that are desirable for certain objectives. For example, measurements may be used to identify a group of communications hubs 210 that have very low latency or very high bandwidth to each other, and these groups may be utilized when applications requiring a group of devices with these properties are desirable (e.g., to find nearby devices that may be able to share multimedia content).

In some embodiments, measurements between ones of communications hub 210; between ones of communications hub 210 and servers/hosts; and between ones of communications hub 210 and remote service 160 can also be used for diagnostics of communications hub 210 devices, remote service 160, or the networks connecting them. These measurements may be triggered periodically, on demand from the end user, or on demand from remote service 160.

In various embodiments, one of communications hub 210, having a list of nearby "neighbors" (e.g., others of communications hub 210 determined to be temporally or spatially proximate) uses the list of neighbors for a number of purposes. For example, one of communications hub 210 identifies neighbors that are on the same ISP network. Generally, traffic flows more quickly between two devices that are both connected to a local network or at least share an ISP (e.g., their local networks are generally directly coupled), but may flow more slowly, or possibly even be "capped" (e.g., bandwidth-limited) when connecting to hosts outside the ISP's network. Bandwidth to outside locations may be restricted (e.g., relatively limited or reduced) based on contractual limits, configuration, etc. When bandwidth to a location outside of the ISP local network is restricted, one of communications hub 210 can request others of communications hub 210—determined to be on the same ISP local network—to assist it by sharing their connections/bandwidth (via their primary network 130, secondary network 140, or both), for example, to perform a download of a number of files and/or to obtain a higher quality streaming experience by using multiple connections.

In some embodiments, communications hub 210 identifies neighbors that are on the same ISP network. For example, large volumes of (data) traffic (are allowed to) flow (and flows quickly) between devices on the ISP local network, but bandwidth to locations (e.g., servers) outside of the ISP local network may be restricted based on contractual limits, configuration, etc. In such cases, communications hub 210 can request others of communications hub 210—determined to be on the same network—to assist it with a need for more bandwidth, for example to perform a download of a number of files and/or to obtain a higher quality streaming experience by using multiple connections (including potentially from other networks, if both primary and secondary networks are available).

Figure 5:
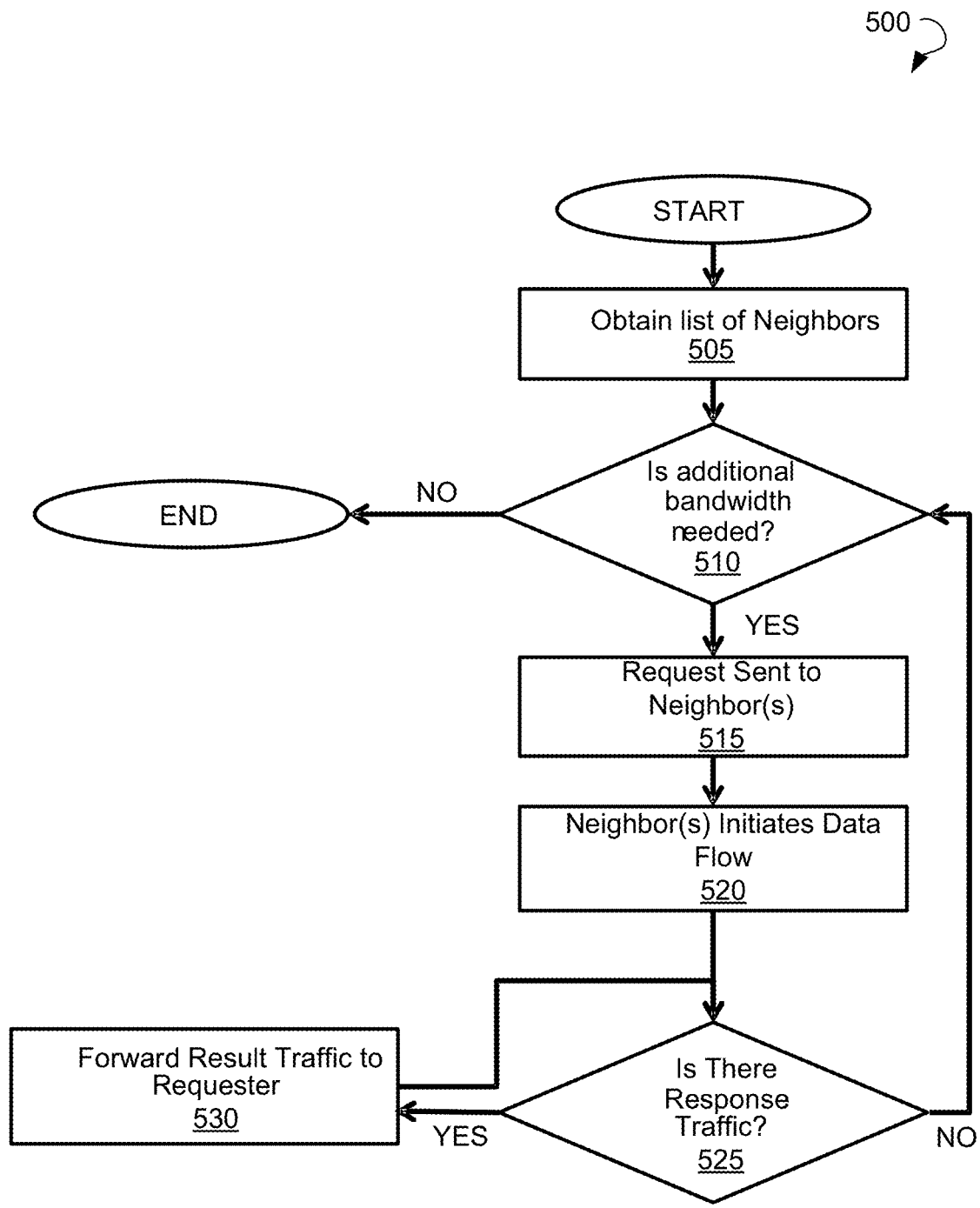
FIG. 5 is a flow diagram of a method for requesting data from a neighboring communications hub, according to some embodiments.

FIG. 5 illustrates a process 500 for asking a (e.g., typically nearby) neighbor to assist with a data/bandwidth need. In some embodiments, process 500 is performed by communications hub 210 (referred to as requester communications hub 610 in FIG. 6). At step 505, remote service 160 is contacted to obtain a list of "nearby" neighbors, obtained and maintained as described above. At step 510, whether additional data/bandwidth is still needed is checked. If not (e.g., the streaming session is complete or the files have already been downloaded), process 500 ends, and traffic is routed normally.

When additional bandwidth is determined to still be needed at step 510, a request is sent to one or more neighbor ones of communications hub 210 (referred to as remote communications hub 650 in FIG. 6) identified to assist at step 515. In instances when a neighbor one of communications hub 210 is unable to help, an alternate one of communications hub 210 is selected, also at step 515. At step 520, remote communications hub 650 initiates a request on behalf of the requestor communications hub 610.

At step 525, remote communications hub 650 checks if there is response traffic (i.e., if it has received downloaded data or streamed data), and if so, the traffic is forwarded back to requester communications hub 610 at step 530. In this way, the public bandwidth of multiple neighbors (e.g., remote communications hub 650) can be utilized, with the results passed over the ISP's local network, which as described above, may have less strenuous bandwidth restrictions.

Process 500 can be performed explicitly by custom operation at a higher (application) level, or may exploit techniques such as TCP-Multipath to use multiple connection paths across multiple neighbors that are later combined to provide improved service. Connectivity via multiple connections at each of remote communications hub 650 (e.g., primary network 130 and secondary network 140) may likewise be utilized, and combined explicitly or by leveraging techniques such as TCP-Multipath and the like.

In a traditional network, data is often not obtained directly from its ultimate source, but instead from a network cache or from a content Delivery Network or CDN. In a CDN, providers of services (e.g., streaming media providers, web pages, and other services) pay a CDN provider to place their data on a number of servers, operated by the CDN provider, at points distributed across the network. By selecting and using local CDN servers, the overall performance experienced by an end user is increased. Similarly, ISPs may sometime operate a local cache, in some cases hosting content from providers who have paid the ISP, or in some cases to store information that is frequently requested in order to reduce the traffic on the ISPs access network.

In some embodiments, using distributed network 410 (FIG. 4), remote service 160 uses storage on multiple ones of communications hub 210 in distributed network 410 to enable local caching of information or to facilitate a CDN. As the determination of "nearness" allows for location of extremely "local" ones of communications hub 210, such a cache or CDN, implemented across multiple ones of communications hub 210, offers significant performance advantages over a traditional CDN approach. For example, this is used to generate revenue for remote service 160, by selling cache capacity to ISPs, or by selling CDN-like services to content producers. By way of further example, a provider of remote service 160 uses the cache or CDN to improve performance as a "value add" for users who have purchased one of communications hub 210, providing additional incentive to purchase a product and/or service from the provider.

In some embodiments, end users may request that their browsing or other network traffic be anonymized. For example, network data traffic is requested to pass through one or more randomly selected ones of communications hub 210. In this way, a server providing data to the end user cannot readily determine who requested the data, since it was requested by and sent to randomly selected ones of communications hub 210. Subsequent requests for data can originate from different randomly selected ones of communications hub 210.

Figure 6:
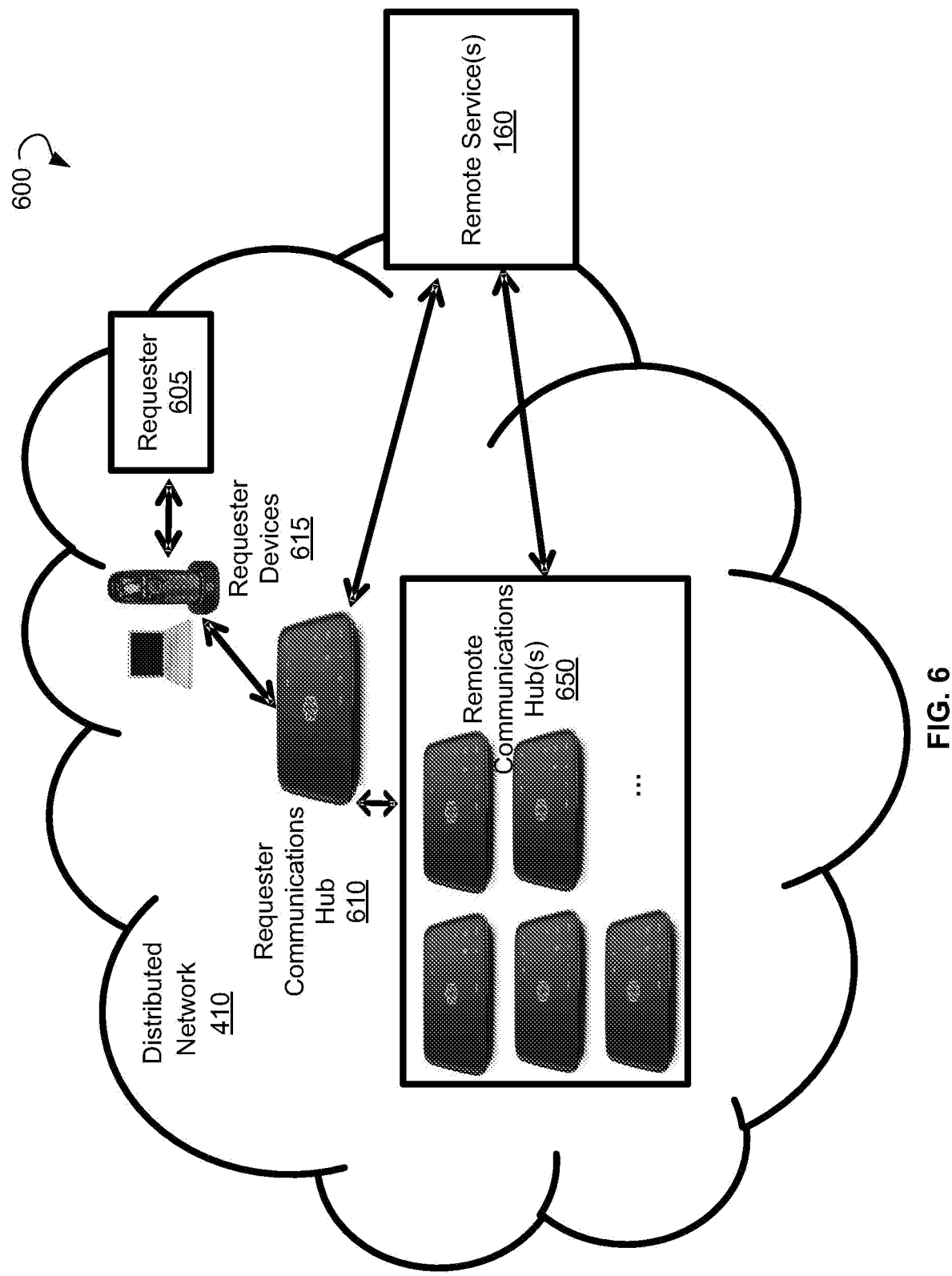
FIG. 6 is a simplified block diagram illustrating a network of communications hubs which may anonymize or alter network communications, according to various embodiments.

FIG. 6 illustrates system 600 for anonymizing or altering traffic flow. Requester 605 is an end user who wishes to anonymize or in some other way modify the behavior of their browsing or other Internet traffic as seen by a target (not shown in FIG. 6). Requester 605 may activate the modified routing behavior, then browse or use others of remote service 160 as usual/normal using requester device 615 (e.g., device 215), via requester communications hub 610. Requester communications hub 610 communicates with remote service 160, which uses one or more of remote communications hub 650 (e.g., of communications hub 210, located at the location of other end users) to facilitate the modified traffic delivery behavior described below.

Requester 605 may activate the modified traffic routing in a number of ways. In some embodiments, a physical interface such as a button or touch screen on requester communications hub 610 is used to activate the feature. In various embodiments, the requester 605 communicates either directly with requester communications hub 610 or with remote service 160 to request the behavior be activated. This communication may take the form of a web request, application message, telephone call, or other interaction.

In some embodiments, requester 605 requests random anonymous traffic routing. Internet traffic that would normally be sent directly by requester communications hub 610 to the destination (e.g., sent directly using one of primary network 130 and/or secondary network 140) is instead sent to remote service 160. Remote service 160 then randomly selects one or more of remote communications hub 650 in distributed network 410, and instructs it to deliver the data traffic on behalf of requester 605. Any return traffic from the destination is then relayed back to remote service 160, which forwards the traffic back to requester 605 (via requester communications hub 610 and requester devices 615). In this way, data traffic will appear to originate from a geographically or topologically distinct location or locations.

An effect can be to anonymize the location of the traffic, or to make it appear to have originated from a particular location, selected based on network location; nation, state, region, zip code, area code or other geographical location; etc. Many services, for example media streaming services, news services, and other websites or services, force geographical restrictions, only allowing access to the service (e.g., webpages, videos, etc.) if the requester is in a certain region. This may be due to license restrictions, tax or fee reasons, or local laws limiting content. Similarly, this capability may be used to bypass restrictions imposed by government systems such as firewalls that may not allow viewing of certain content of visits to particular sites.

Figure 7:
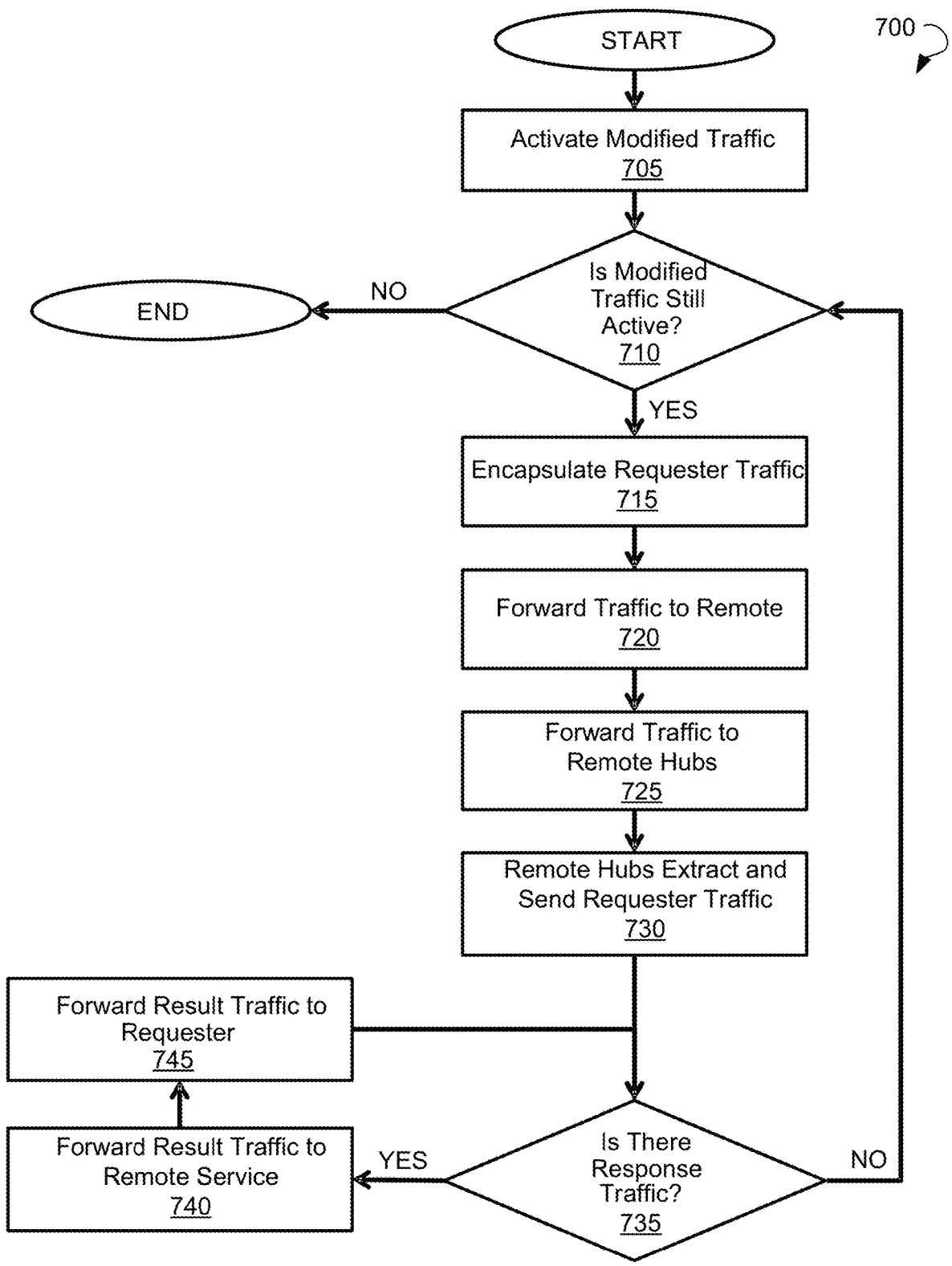
FIG. 7 is a flow diagram of a method for anonymizing or altering network communications, in accordance with some embodiments.

FIG. 7 illustrates process 700 of modifying Internet traffic from requester 605. At step 705, the requester 605 can activate the modified traffic behavior. At step 710, whether modified traffic is still active can be checked. If not (e.g., requester 605 has turned off the behavior), process 700 ends, and traffic is routed normally by requester communications hub 610.

When modified traffic behavior is still active at step 710, the data traffic can be encapsulated with appropriate headers at step 715. These headers will vary depending on the type of modified data traffic employed, as described below. At step 720, the encapsulated traffic data can be passed to remote service 160, and appropriate ones of remote communications hub 650 are selected. The headers encapsulating the traffic data may be modified as needed, again, as described below.

At step 725, the encapsulated data traffic can be passed to the remote communications hubs 650 by remote service 160. The traffic data is extracted, and sent to the target by the remote communications hubs 650 on behalf of the requestor 605 at step 730.

At step 735, remote communications hub 650 can wait for responses to the data traffic for requestor 605. When there is response traffic (or while there continues to be response traffic), the response traffic can be encapsulated and forwarded back to remote service 160, at step 740. Encapsulation and sending the data is shown in FIG. 7 as a single step for simplicity, but multiple steps may be used. At step 745, the resulting traffic can be forwarded (e.g., potentially with modified headers, as described below) from remote service 160 back to requester 605, which extracts the encapsulated response. When all response data has been received, processing resumes at step 710.

Process 700 can be transparent to requester device 615 (and thus to requester 605, except for the fact that they requested the modified traffic behavior). Requester communications hub 610 can encapsulate the data traffic and present the extracted responses automatically. To a remote party, the data traffic will appear to have originated from (and response sent to) not requester 605, but one or more of remote communications hub 650.

While process 700 is shown as a simple send-receive process for illustrative purposes, some embodiments may employ multiple instances of process 700 running simultaneously. For example, if a real-time communications stream is active, both outbound traffic and response traffic may be relayed through remote communications hub 650 simultaneously. Similarly, traffic may be sent from or received by more than one of remote communications hub 650.

In various embodiments, remote service 160 selects other participating ones of remote communications hub 650 to relay the data traffic on behalf of requester 605. Remote service 160 optionally strips information identifying requester 605 from the data traffic, to anonymize requestor 605 (anonymous to remote communications hub 650).

According to some embodiments, the one (or more) of remote communications hub 650 selected by the remote service 160 is selected randomly, to obfuscate the true origin of the traffic. In various embodiments, the one (or more) of remote communications hub 650 is selected such they meet the criteria of having a certain property specified by requester 605. These properties may include any of those described above (e.g. geographical location, provider ISP, time zone, etc.) or another property. As an example, certain services may only be available to customers from particular regions, or discounts offered only to certain regions or to subscribers of certain network providers. As described herein, users in other regions may make their traffic appear to originate from the desired location.

According to various embodiments, remote service 160 is queried for a list of participating ones of remote communications hub 650. For example, after obtaining the list, remote service 160 is not involved in the process of relaying traffic, and the traffic is sent directly from requestor communications hub 610 to remote communications hub 650, without relaying through remote service 160. Steps 720 and 740 in FIG. 7 could be omitted. In this way, requester 605 can ensure that traffic remains anonymous to remote service 160, at the expense of making requestor communications hub 610 visible to remote communications hub 650. As above, the selection of remote communications hub 650 may be random, or selected for some desirable property.

Additionally or alternatively, if a large number of remote communications hub 650 agree to participate in onion routing, then packets may be encapsulated (e.g., a random number of) multiple times, and forwarded to many different ones remote communications hub 650. For example, if at least hundreds of communications hub 210 agree to serve as remote communications hub 650 for anonymization, traffic from any of those hundreds of hubs cannot be identified any more specifically than having originated from one of them. More remote communications hubs 650 participating (e.g., thousands and/or millions) provide increased anonymity, as traffic is now potentially from any of these many sources. A distribution of remote communications hubs 650 across a wide geographic (and potentially jurisdictional) area can further obfuscate the identity of the true source of the traffic. In terms of the number of times information is forwarded, minimally 2 different intermediary remote communications hubs 650, though typically three or more are used in onion routing (described below). In some embodiments, given the large number of communications hub 210 available in a distributed network 410, more of intermediary remote communications hubs 650 may be used to improve anonymity. Each one of remote communications hub 650 extracts, and if further encapsulation exists, then forwards the traffic to another one of remote communications hub 650. Responses are similarly "unwound" and returned to requester 605, providing a very highly anonymous (e.g., to target, remote communications hub 650, and to remote service 160) traffic delivery system using a network of communications hub 210 operated by remote service 160.

In some embodiments, onion routing is used. For example, remote service 160 maintains a set of communications hubs 210 comprising distributed network 410. Requester communications hub 610 can obtain a list of these other hubs, remote communications hub(s) 650, and select some number (e.g., minimally two, with more resulting in increased security, but more overhead) to use to relay traffic. This set of remote communications hubs 650 is then arranged into a chain to relay information through. For example, if requester communications hub 610 (call this A) selects 3 remote communications hubs 650 to form the chain (call these B, C, and D), information will be relayed from A, through B, through C, and finally to D, who will send information (on behalf of A) to the target. This final node in the chain (node C) is sometimes referred to as the exit node. When the target responds, the traffic will be sent from D, back to C, to B, and finally to A.

Requester communications hub 610 obtains cryptographic keys for each other remote communications hubs 650 in the chain, allowing it to encrypt messages that can only be read by the desired remote communications hub 650. These may either be obtained directly from remote service 160, or negotiated (e.g., using Diffie-Hellman key exchange) between each pair in the chain, relaying these back over the chain to requester communications hub 610. Note that when negotiating, A will first negotiate with B, then use B to relay the messages to negotiate a key with C, so that C only is aware it is communicating with B, and is never aware of A.

Once A has the set of keys, it encrypts the final traffic (intended for the target) using C's key, and marks it as destined for target. This encrypted message is then encrypted (again) using B's key, and marked as destined for C. Finally, this encrypted message is encrypted (again) using A's key and marked as destined for B.

The complete message is sent to A. Upon decrypting it, A finds an encrypted message, marked as being destined for B. A relays the message to B. B decrypts the message, finding an encrypted message, marked as being destined for C. The message is forwarded to C, which decrypts it, sees it is destined for the target, and sends the message to the target. At each step along the chain, the intervening remote communications hubs 650 only know where the information originated, and where it is destined, and that there is a message to be sent to that destination. Note also that each step in the chain "remembers" the last hop from which it received a message.

Responses from target are returned to C, which then uses the remembered source to return the messages (encrypting along the way). The final message (containing the response) is received by the requester communications hub 610.

While remote communications hubs 650 along the path know their source and destination in the chain, no single remote communications hub 650 along the path knows of both the requester communications hub and the final remote communications hub 650 that reached target.

These features can be combined with the selection of a geographically positioned node described above to help circumvent censorship and filtering of content. They also can help to deliberately "craft" a view of where the traffic appears to be originating. Some embodiments offer the advantage of improved source/destination spoofing using enhanced selection of exit nodes. For example, the exit node where traffic exits the network can be selected to be in a region allowing access to the desired content, while intermediate nodes may be selected randomly to obfuscate the source of the request.

As described above in relation to FIG. 5, process 700 can be performed explicitly by custom operation at a higher (application) level, or may exploit techniques such as TCP-Multipath to use multiple connection paths across multiple neighbors that are later combined to provide the anonymized service. Connectivity via multiple connections at each remote communications hub 650 (e.g., primary network 130 and secondary network 140) may likewise be utilized, and combined explicitly or by leveraging techniques such as TCP-Multipath and the like.

In embodiments having communications services provided by remote service 160 and communications hub 210 equipped with an FXO port that can be used to place outgoing phone calls using a conventional analog telephone line, an analogous process allows phone calls to be placed from many different phone numbers. Selection of the remote number could be for a number of reasons, including to obfuscate the caller's identity and to allow the caller to appear to be from a different area code or geographic region.

The capabilities of distributed network 410 (FIG. 4) comprising a plurality of communications hub 210 and including the property of serving as control for the home network (e.g., LAN 220), also allow for monitoring of network behavior of each communications hub 210 individually or all of communications hub 210 collectively. Destinations of data traffic, as well as the volume of that data traffic, time of day, IP ports used, type of data traffic, rates of data traffic, and other information may all be monitored.

In some embodiments, this capability is used to provide monitoring and control (e.g., rules) services to the end user directly. The end user, via user interface module 345, configures the system to provide alerts, delivered either directly (locally) through communications hub 210, or via remote service 160.

End users may configure alerts to be sent when data traffic patterns (e.g., internal and/or external) change; when (predetermined) limits of bandwidth used are reached; when certain data traffic occurs at specified times of the day, days of the week, etc.; when traffic originates or terminates at specified ports; when traffic is directed at predefined destinations (e.g., either explicitly or in a particular category, such as pornographic sites). In this way, unusual behavior, for example a particular system in the end user's network being compromised and participating in a denial-of-service (DDoS) attack as a member of a "botnet", can be detected and stopped. Some embodiments are used to monitor browsing behavior (e.g., including time of day, total bandwidth, sites accessed, to identify surreptitious or otherwise inappropriate use) of minors in the home, and via rules, to control such behavior. Various embodiments are used to ensure that when an ISP provides only a certain limit of data use in a month, that the limit is not exceeded.

In some embodiments, alerts are generated for exceptional or very unusual behavior, even in the absence of configuration by the end user. For example, a less tech-savvy end user may not know how to configure their system properly, and would not configure alerts. However, a sudden, dramatic increase in traffic, abnormally frequent access of a particular location, radical change in bandwidth usage, behavior that matches pre-configured rules to identify malignant behavior, or connections to known malignant sites may indicate that a virus, DDoS bot, or other malware has infected device 215 accessing the network via communications hub 210. In such a case, remote service 160 can take action proactively, increasing the value of remote service 160 is offering. Actions taken can include notifying the end user, for example via short message service (SMS) text messages, email, or phone call; automatically dropping the suspect traffic from device 215; terminating device 215's connection to LAN 220; and the like.

The end user can also access logs, captured data, trends information, etc., as well as modify settings, either internally (e.g., via user interface module 345) or remotely from the remote service 160 (e.g., via remote management module 350).

The user is able to select how alerts are to be delivered. Alerts may be delivered as SMS text messages delivered to one or more end user cell phones; as a phone call to an end user cell phone or an end user communications device associated with communications hub 210; as a mobile app alert; displayed on a web page; delivered as an email; as a light, sound or other indication delivered by physical components of communications hub 210; or some combination. Information may also be accessed in a "report style," on demand, or delivered periodically, again, using any or all of the above mechanisms.

In some embodiments, distributed network 410 includes many thousands of communications hub 210, and remote service 160 can identify (sudden) changes in aggregate behavior. If, for example, a sudden increase in (inbound) traffic from or visits to a single source to many of communications hub 210 is observed, remote service 160 may infer valuable information about popular new sites or videos. Similarly, if a sudden outbound traffic flow (particularly large flows) from many of communications hub 210 to a single or small number of destinations is detected, it can be used to identify a new DDoS target, or a new virus, optionally allowing remote service 160 to assist in stopping these attacks, either by identifying infected device 215 or by blocking the traffic from reaching the Internet by dropping it at communications hub 210. An abnormal or unusual number of inbound connections from particular sources or to particular ports observed by one or more of communications hub 210 devices may also be used to detect a new virus, worm, or other malware in the earliest stages of infection.

Additionally or alternatively, remote service 160 may configure one or more of communications hub 210 to appear to be a computer, server, or other device with a known vulnerability, and some artificially interesting property or data. In this way, remote service 160 creates a "honeypot" that hackers would attack, and in doing so reveal themselves and the systems they are using to mount the attack. These many honeypots, running on the communications hubs 210 comprising distributed network 410 can be well distributed, both geographically and topologically (that is, across various network providers). Additionally, unlike solutions running on individual consumer end user computers, various embodiments running on a large number of communications hubs 210, can be better suited to be reached by nefarious actors. The nature of the communications hub 210, which in many cases serves as a firewall and this has a "naked" connection to the Internet (e.g., rather than a computer or other device that may be behind one or more firewalls) provides a better opportunity to attract attackers. This information, rather than being kept by one host in isolation, may be relayed to remote service 160 which will then collectively monitor the actions of attackers against a large number of hosts (e.g., communications hubs 210). Remote service 160 can identify hostile network hosts, or if the inbound (attacking) traffic destined for the honeypot is originating from a machine controlled by the remote service 160, remote service 160 can communicate with the user to identify a compromised "bot" system, or shut down systems being truly used in a malicious way.

Unusual activity, as described above, is transmitted to remote service 160. By correlating the logs from many communications hub 210 devices, remote service 160 can detect new attacks, and identify which geographic location, IP address range, network service provider, etc. may be the subject or source of any such attack.

Information about specific targets (e.g., a particular website) or about new malware may be obvious earlier in data collected from a distributed network 410 than in a system examining only individual systems. If the attack has not yet reached a level to shut down the target or cause significant problems, it may go undetected, but an anomalous increase in connections to a particular target, aggregated across a large number of communications hub 210 devices would indicate a nascent attack. The provider of remote service 160 may intervene, terminating the attack, or alert the target (e.g., as a paying service), allowing revenue generation from this novel information.

Information obtained about threats or attacks can be communicated to end-users by remote service 160 in a large number of ways, and end customers in some cases may interact with the information conveyed. The information may be displayed visually or provided in audio form directly by communications hub 210. The information may be presented via an alert delivered to the customer, via text message (e.g., IM or SMS), email, web page, mobile application push notification, audio-video communications, and the like.

The end customer may be presented with alternatives to take action. For example, the users may be informed of a new threat, and alternate security settings for communications hub 210 may be suggested/provided by remote service 160. For example, a threat attacking particular port numbers might initiate a communication (e.g., in any form described above) from remote service 160 indicating that open ports in this range should be closed. Additionally or alternatively to messages to all users, the message may be tailored to only be sent to customers known to have that port open, given the control of communications hub 210 exercised by remote service 160. Similarly, techniques may be used by remote service 160, operating on communications hub 210 (e.g., deep packet inspection, MAC address lookup, and other techniques) that allow remote service 160 to identify and catalog the various devices 215 and/or software running on devices 215 that a particular end customer operates on their LAN 220 behind communications hub 210. Attacks detected using the honeypots, and targeted at devices 215 and/or software running on devices 215 known to be behind a customer's communications hub 210 will thus trigger targeted messages.

The messages may provide interactive opportunities, allowing users to open configuration options, automatically correct problems, view information about new threats, and the like. In some cases, solutions may be taken automatically instead, without customer response or other action.

In addition, attack information obtained as described above may be used to instruct (automatically) or facilitate (via notification of the end customer and their own action) a communications hub 210 to switch traffic amongst primary network 130 and secondary network 140 in response to threats or attacks against one of the networks.

Additionally or alternatively, a large number of communications hub 210 comprising distributed network 410, and equipped with connections to both primary network 130 and secondary network 140, provide remote service 160 with valuable information about the operations of primary network 130 and secondary network 140, and about the broader Internet connectivity between these networks. This includes indications of routing failures (e.g., outages), latencies between hosts on or between different networks, jitter experienced on or between different networks, packet loss and retransmission rates of different networks, and the like.

Figure 8:
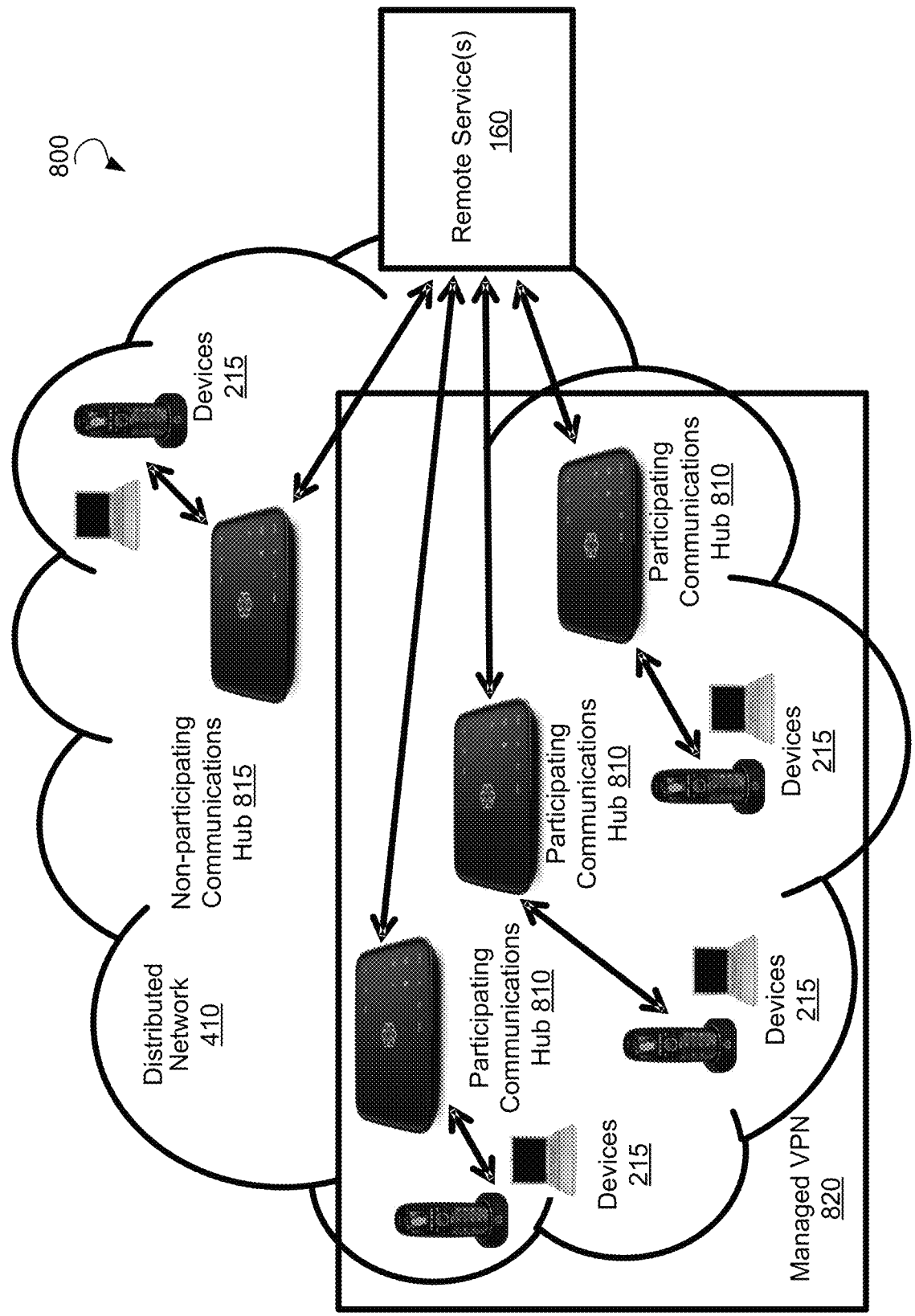
FIG. 8 is a simplified block diagram illustrating a partitioned network of communications hubs, in accordance with various embodiments.

FIG. 8 illustrates network 800, according to various embodiments. A number of communications hub 210 are used by end users to connect to remote service 160, and the end users connect a respective device 215 to a respective communications hub 210. In network 800, different ones of communications hub 210 are shown in two categories, participating communication hub(s) 810 and non-participating communications hub 815. Participation indicates communications hub 210 is a member of a Virtual Private Network (VPN), such as managed VPN 820.

VPNs are a system in which secure (tunneled) connections are made between different networks, for example, allowing a (remote) network device to appear to be on another (local) network, as though the remote devices are physically located and connected to the local network. For example, VPNs are frequently used to allow a remote worker to connect devices in his/her home to their employer network, participating as though they were in the office. Devices or hosts connected over the VPN not only can participate as if they were on the employer network, but also can be administered as if they were a part of the network.

In some embodiments, remote service 160 includes a managed VPN service where end users connect with one or more other end users using a VPN connection. The example of FIG. 8, illustrates three (other numbers may be used) of participating communications hub 810. When each of participating communications hub 810 powers on and connects to remote service 160, configuration information can be provided to each of participating communications hub 810, indicating that it is to participate in a VPN, and a VPN is established among each of the participating communications hub 810.

According to various embodiments, one of participating communications hub 810 acts as a "master" device. LAN (e.g., LAN 220 in FIG. 1) created by master device will be used for the settings of other "slave" devices. That is, the settings and configuration made for the "master" LAN will also be used for the LANs produced by all VPN connected "slave" devices. Management and settings for "slave" ones of participating communications hub 810, for example configuration for the DHCP server; security and firewall settings; monitoring and control alerts, as described above; communications services; and the like can be taken from the master device. As an example, a tech-savvy family member may configure their participating communications hub 810 to be the master, configuring reasonable settings for security, DHCP, etc. Other family member's participating communications hubs 810 connect as slaves, and either use the same settings, or are configured independently, but via options set on the master device, rather than requiring the non tech-savvy user to configure the device themselves.

The remaining, non-master ones of participating communications hub 810 (aside from the master device) join in a "slave" mode. In slave mode, when participating communications hub 810 boots, participating communications hub 810 receive from remote service 160 (and its respective configuration) what is needed to establish a VPN connection to the master device, and then establish the VPN. Once the VPN is established, the slave ones of participating communications hub 810 use the VPN to route all internal traffic (e.g., data traffic intended for the local subnet) via the master one of participating communications hub 810, and potentially some or all of the external traffic, such as data traffic intended for non-local subnets).

Figure 9:
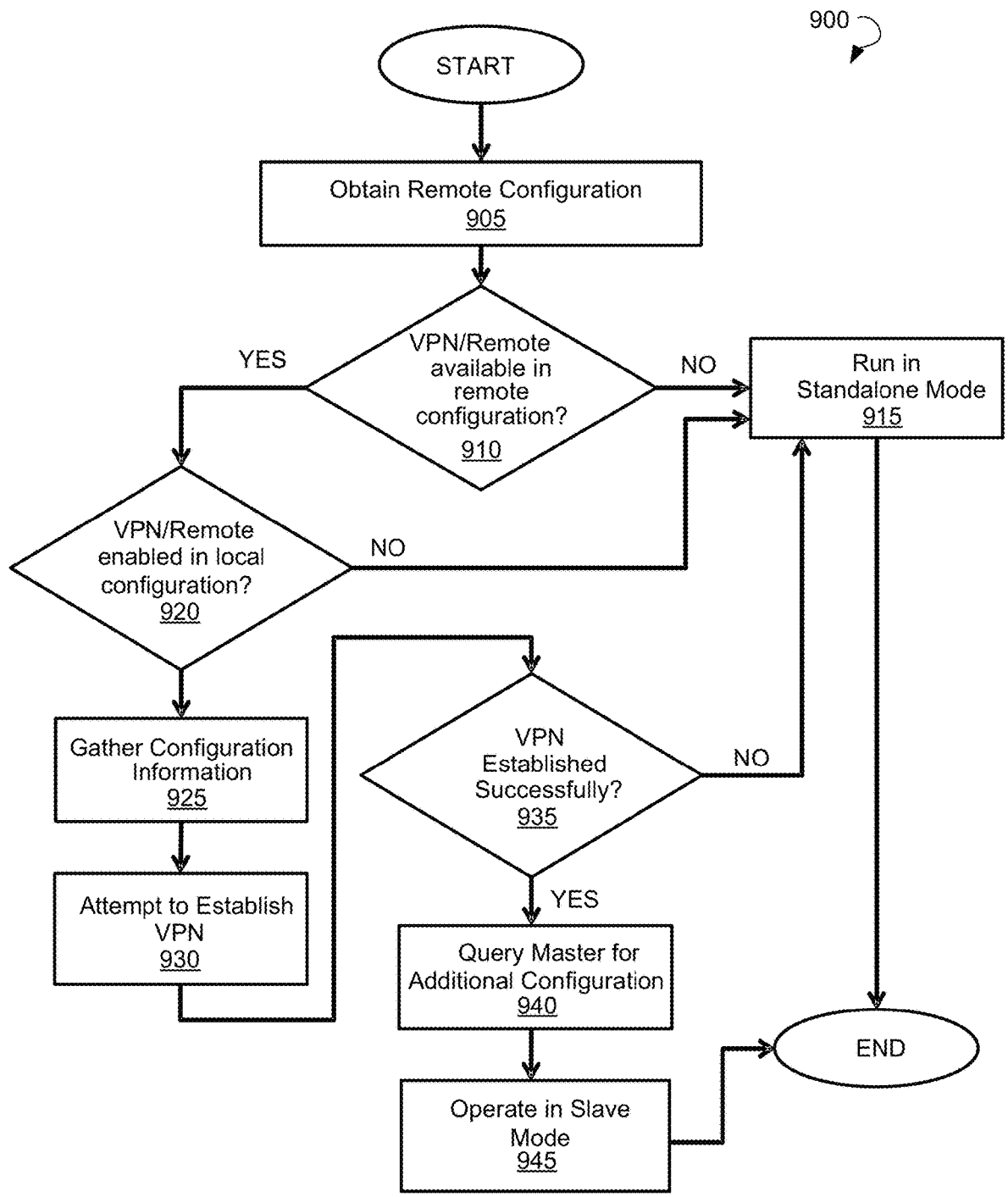
FIG. 9 is a flow diagram of a method for initialization of a communications hub, according to some embodiments.

FIG. 9 illustrates a process 900 for determining by communications hub 210 (referred to as an "initializing" hub) it is to be a slave and for establishing the VPN connection to the master network, or to operate in standalone mode. At step 905, the initializing hub can contact remote service 160 and obtains remote configuration information. The remote configuration information can be examined to determine if any of participating communications hub 810 have offered to serve as a master at step 910. If not, the initializing hub does not become a slave, and runs in standalone mode at step 915. When the remote configuration information indicates that one of participating communications hub 810 is available to serve as a master, at step 920 the local configuration of the initializing hub can be examined to see if a matching entry indicating that the one of participating communications hub 810 should be used as a master is present. If not (i.e., one of participating communications hub 810 is offering to be a master, but the initializing hub is not configured to be, or chooses not to be a slave), the initializing hub runs in standalone mode, as indicated at step 915. When a corresponding local configuration matches the offered remote hub, the initializing hub proceeds to join as a slave, starting at step 925.

While some configuration information is shown as being obtained from remote service 160 and some obtained from the local configuration of the initializing hub, in various embodiments, the initializing hub may be "hard coded" or configured only to operate as a slave 945 (e.g., at the time it is purchased, or configured by the end user before deployment, such as by an adult child and given to an elderly parent to allow the parent's network to be managed by the adult child). In these cases, local configuration may be absent, limited, or non-modifiable. Additionally or alternatively, other configuration mechanisms may be used, such as physically taking the slave to the master network and connecting it, allowing it to "learn" about the master by direct connection via Ethernet, Wi-Fi, USB, Firewire, or other connection; pairing with a master via a another network (e.g., Bluetooth, NFC, etc.); configuration on the initializing hub being activated by visiting and acknowledging a web page, email, or similar invitation from the master; scanning a bar code, QR code, or other visual identifier to identify and locate a master; entering a code or other information to identify and locate a master; configuring via physical media (such as a flash memory card, stick, etc.); or other means.

At step 925, configuration information (e.g., obtained from remote service 160, local configuration or other mechanisms listed above) can be gathered. Additionally or alternatively at step 925, authentication information, such as passwords, passphrases, keys, visual images (e.g., barcodes, QR codes, etc.) etc. for establishing the VPN connection can be gathered by the initializing hub. At step 930, the initializing hub attempts to establish a VPN connection with the master hub, and at step 935 whether the connection has been established successfully is determined. If not, the initializing hub may retry (not depicted in FIG. 9). When after reasonable efforts to retry the VPN connection cannot be established at step 935, the initializing hub runs in standalone mode at step 915.

When the VPN is established successfully at step 935, process 900 continues at step 940, where the initializing hub obtains any additional configuration information about how it should behave, this time directly from the master hub. Information that would be obtained at step 935 includes, but is not limited to: local IP subnet and mask for the (combined) VPN-paired local network; local (internal) IP address for the initializing (slave) hub to use; instructions on whether to pass DHCP requests to the master hub or to run a local DHCP server, and if run locally, IP addresses to use, first hop router addresses, TFTP server addresses, DNS server address, and other network configuration information to provide; details of information that should be tracked and shared with the master hub for the purpose of monitoring, alerting, etc.; information determining if all Internet traffic (e.g., even traffic not confined to the VPN, such as external requests) should be routed to the master hub or directly placed on the Internet using the slave hub's primary network 130 and secondary network 140; security and access rules for traffic; firewall settings for the initializing (slave) hub's network connections; definitions of traffic classes to be passed, filtered, or otherwise delivered to the master hub; information about devices connected to the master hub and their network information; information about other slave hubs, their networks, their configuration, and devices connected to them; configuration information for wireless services to be provide by the initializing (slave) hub; and other information needed to allow the initializing (slave) hub to operate, via the VPN, as if it was part of the network managed by the master hub; Network Address Translation (NAT) settings, including configuration about hosts reachable from the outside, port forwarding, demilitarized-zone (DMZ) hosts, enabling or disabling NAT traversal protocols or systems (such as uPNP, ICE, STUN, and TURN) and other NAT related settings; QoS marking settings; and error logging settings.

For wireless network settings, the initializing hub (slave) may be configured either to provide a separate wireless network, or to serve as an extension of the master hub's wireless network. In the case where the initializing hub (slave) is configured to extend the master hub's network, the initializing hub (slave) can obtain configuration from the master, and establish a wireless network with identical SSID, security, and other settings to the master. In this case, wireless devices (clients) moved from the wireless network operated by the master hub to that generated by the initializing hub (slave) or other slaves (or vice versa) would be able to seamlessly use either network.

Communications hub 210 determining whether it is to be a master may be similarly controlled by configuration (not depicted in FIG. 9).

Figure 12:
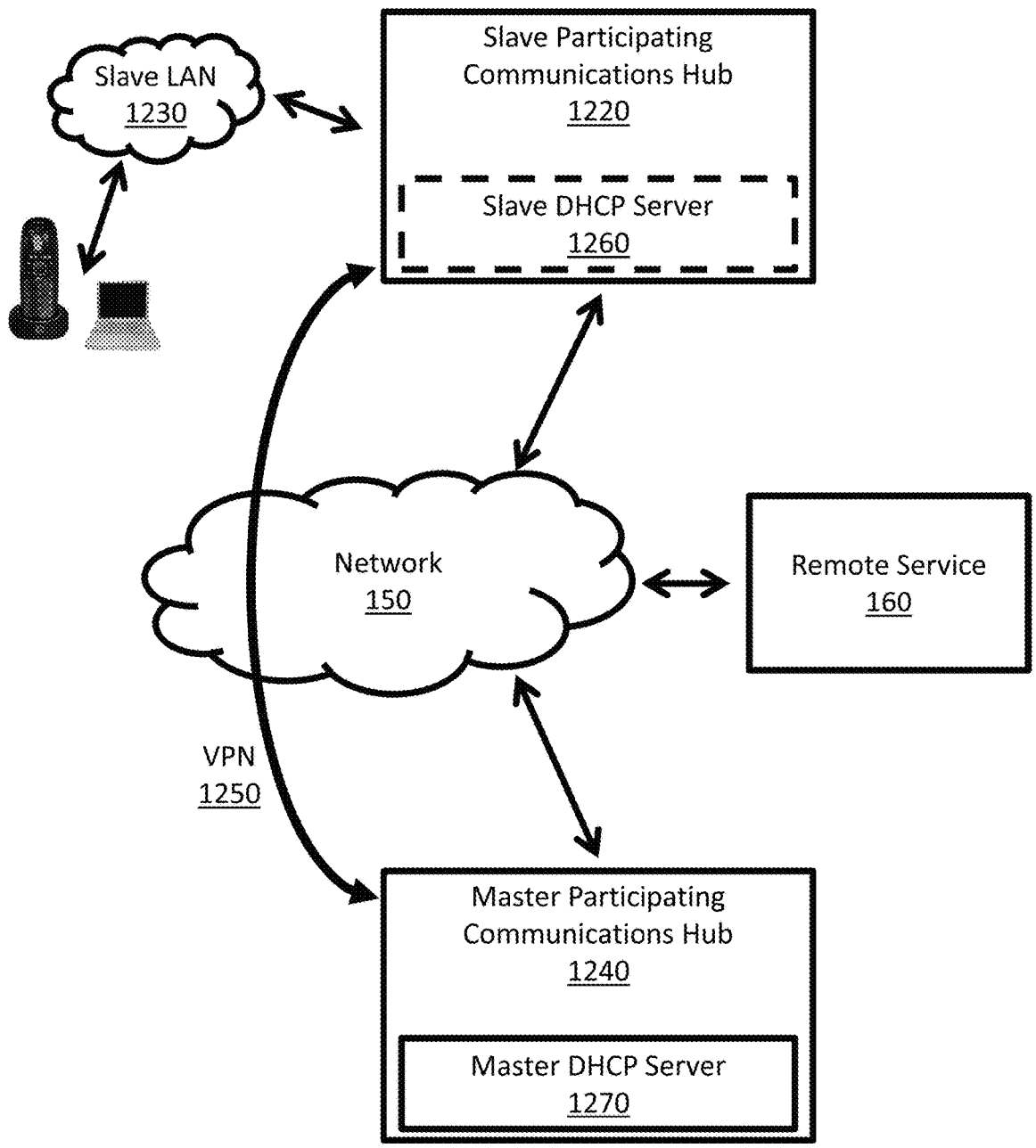
FIG. 12 is a simplified block diagram of a system in accordance with various embodiments.

According to some embodiments, the VPN allows DHCP domains to be shared between the slave (which previously completed initialization) hub and the master hub. FIG. 12 illustrates a block diagram 1200 of a system according to some embodiments. Slave client 1210 (e.g., device 215 in FIG. 2) can be attached to slave participating communications hub 1220 (e.g., participating communications hub 810 in FIG. 8) via slave LAN 1230 produced by slave participating communications hub 1220. Further, slave participating communications hub 1220 can be connected to master participating communications hub 1240, via VPN 1250 running over network 150. This connection can be established as described above, using information obtained from or with the assistance of remote service 160. Additionally, slave DHCP service 1260 can run in software on slave participating communications hub 1220, and can be in contact (e.g., via VPN 1250) with master DHCP service 1270 running in software on master participating communications hub 1240.

Figure 10:
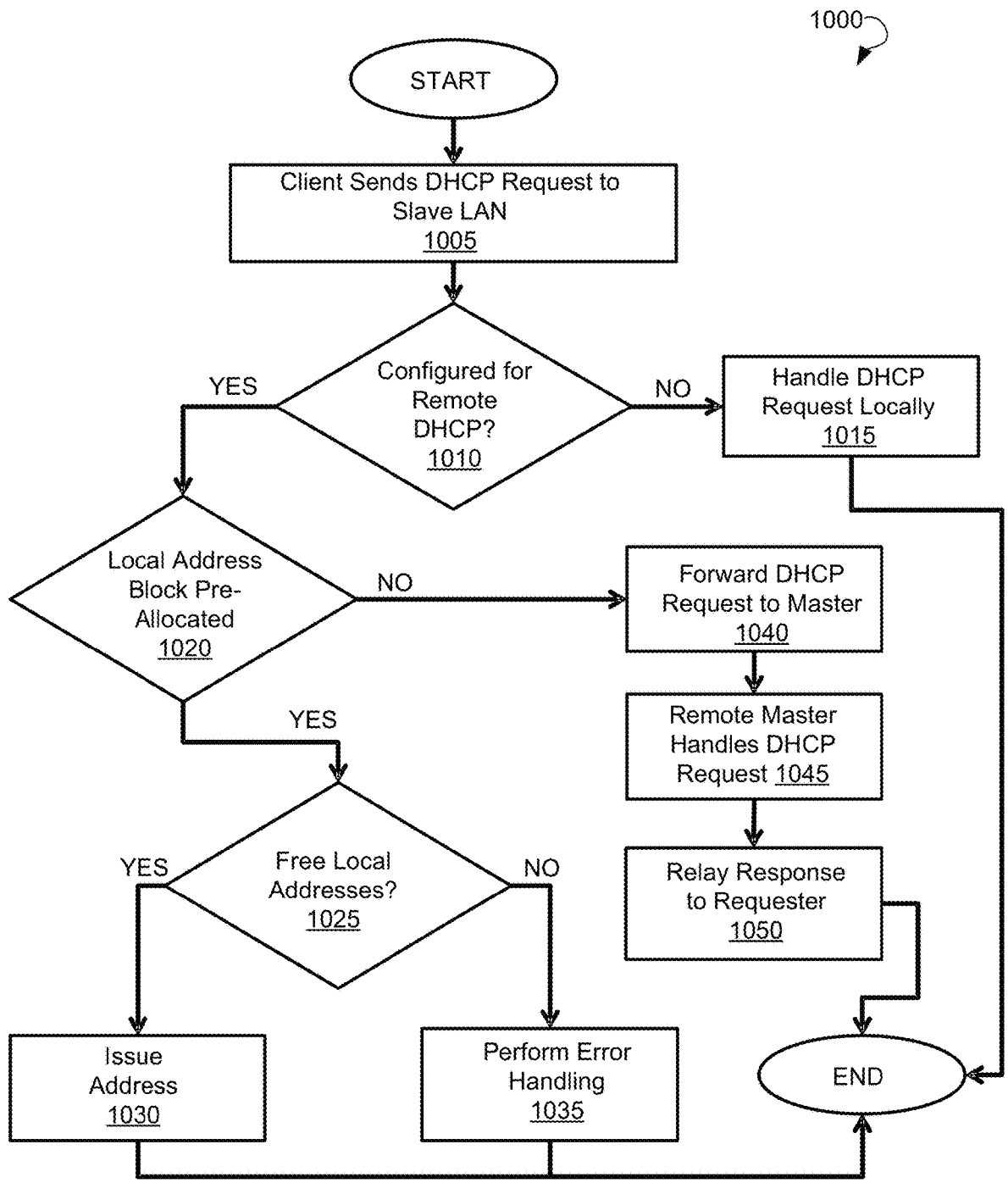
FIG. 10 is a flow diagram of a method for operating a communications hub, according to various embodiments.

FIG. 10 illustrates process 1000 for processing a DHCP request by slave client 1210 made on the slave hub LAN 1230. At step 1005, slave client 1210 can present a DHCP request to the local network (LAN) 1230 on the slave hub, and the message is detected by slave participating communications hub 1220. At step 1010, the slave participating communications hub 1220 can determine if slave LAN 1230 is configured to allow for remotely managed DHCP, controlled by master participating communications hub 1240. If not, local DHCP handling can be invoked at step 1015. This handling could be handling the message in (optional) local slave DHCP server 1260 (operating independently), or simply ignoring the request. If remote DHCP is configured, control can continue to step 1020, where the message can be passed to slave DHCP server 1260, which determines if it has been pre-provisioned with a set of DHCP addresses for use on the slave hub network.

At step 1020 slave DHCP server 1260 can determine if it has been configured to have a master-configured local DHCP server, and master DHCP server 1270 has pre-allocated a subset of addresses to be managed and distributed locally in a configuration step performed earlier, for example at boot time of slave participating communications hub 1220 (step not shown). If so, slave DHCP server 1260 can check to determine if any of the pre-allocated addresses are available at step 1025, and if so, an address is issued to slave client 1210 at step 1030. As is well known to one skilled in the art, in addition to providing an IP address, DHCP may provide additional information such as network mask, first-hop router, TFTP server, DNS server, and the like. At step 1030 this additional information can also be provided to the slave client 1210, as directed by the master DHCP server 1270. If there are no more addresses available at step 1025, error handling can be performed at step 1035, which may include having the slave DHCP server 1260 contact the master DHCP server 1270 to obtain additional addresses, refusing to issue an address, forwarding the request to the remote master DHCP server, and the like.

When slave participating communications hub 1220 is configured to support remote DHCP at 1010, but is not configured to have local slave DHCP server 1260 with allocated addresses to handle requests at step 1020, the message is instead forwarded (e.g., via the VPN 1250 connection established at step 930 of FIG. 9) to master DHCP server 1270 at step 1040, which handles the request directly at step 1045. This handling may include handling the request successfully, rejecting the request, ignoring the request, or any other action a local DHCP can take. The response (if any) is relayed back to the slave client 1210 that originated the DHCP request at step 1050.

While DHCP behavior is provided in detail here for illustrative purposes, as would be readily appreciated by one of ordinary skill in the art, slave participating communications hub 1220 can have other protocols and/or behaviors similarly controlled and/or forwarded by the master hub. Examples include "rendezvous" or discovery protocols such as Apple's Bonjour protocol, Active Directory and discovery protocols on Windows; the protocols making up the zeroconf suite; SLP; UPnP; LLMNR; other DLNA protocols; Apple AirPlay; and the like. Additionally, broadcast, multicast, and similar behaviors can be configured for optional control by the master hub. Similarly, configuration of firewall rules, and other configuration can be handled in a similar fashion.

In some embodiments, communications hub 210 is configured and administered remotely by remote service 160, even before communications hub 210 has been (properly) connected to a primary network 130, for example when first removed from the shipping box. For example, this configuration is accomplished over secondary network 140. In some embodiments, secondary network 140 includes a cellular or other wireless network, such as 4G, accessed via secondary network module 310. In various embodiments, these devices are associated with a particularly carrier or service provider at the time they are sold, and are ready to connect as soon as they are powered up. For example, by agreement with the service provider at the time the device is manufactured or shipped, connections between the device and the provider of remote service 160 is enabled (e.g., by pre-arranged action of the service provider) when the device is powered on. When the device is powered on, the device can be accessed remotely by remote service 160, allowing them to either configure, or assist the end user to configure the device to provide them service.

Figure 13:
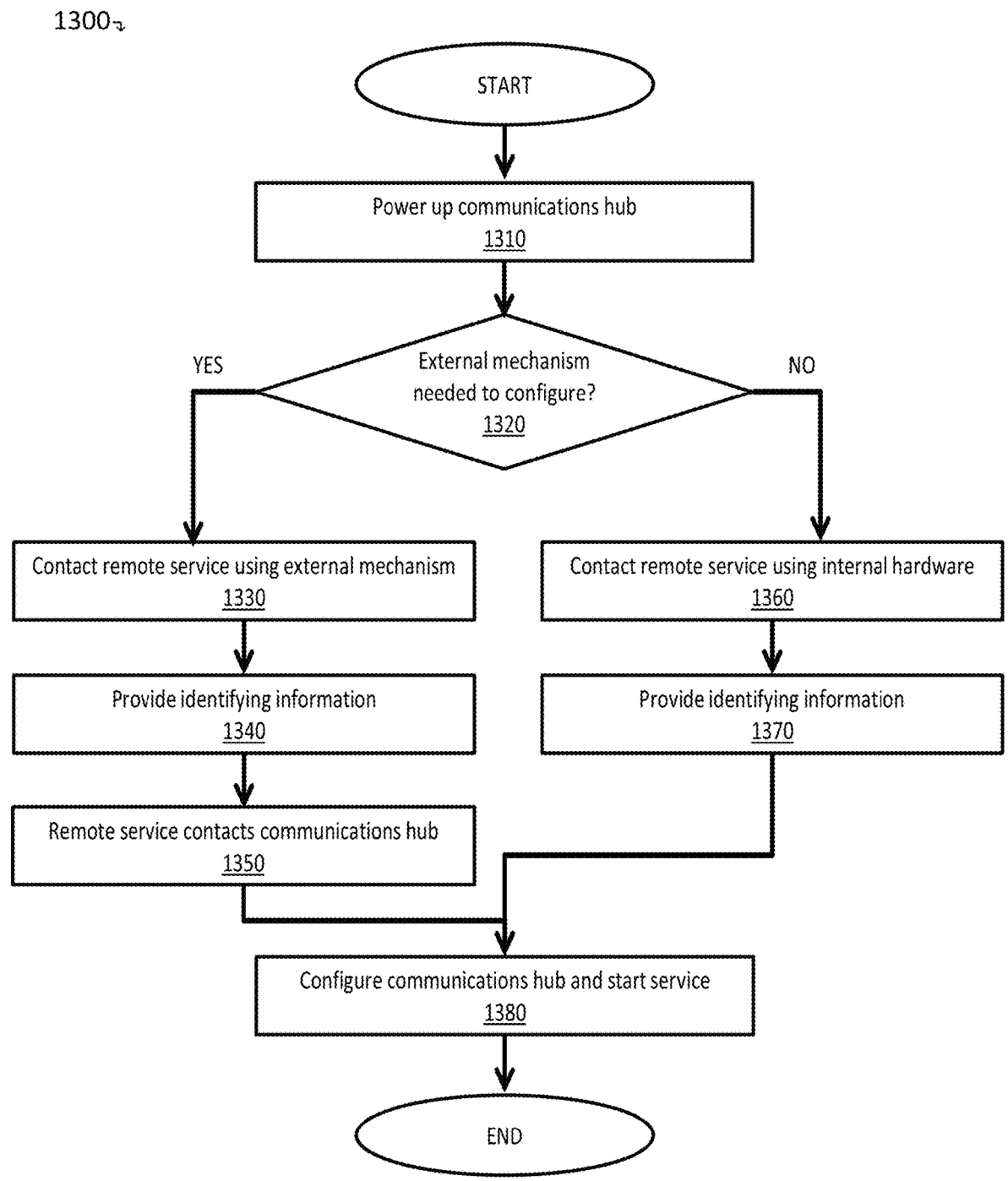
FIG. 13 is a simplified flow diagram of a method according to some embodiments.

FIG. 13 depicts a process 1300 for initiating a configuration process, according to various embodiments. At step 1310, the end user can power up (newly purchased) communications hub 210. At step 1320, whether an external mechanism is used to connect to remote service 160 and configure the device is determined. This may not be needed in some cases. For example, if communications hub 210 has internal mechanisms to allow configuration, including a touch screen, screen with keypad, a microphone allowing the end-user's speech to be captured, or some other mechanism, and additionally has connectivity to reach remote service 160 (e.g., a secondary network 140 that is pre-configured (pre-provisioned), for example cellular service), an external mechanism may not be required. Similarly, even if communications hub 210 lacks an internal mechanism to capture information, if it is equipped with connectivity, configuration is possible by connecting device 215 to communications hub 210 and using it over secondary network 140 to connect to remote service 160.

If an external mechanism is required, then at step 1330, the end user contacts remote service 160, by calling a phone number, accessing a web page, texting, or some other external mechanism to reach remote service 160.

At step 1340, the end user provides identifying information about the communications hub 210 and themselves. The information about themselves that may be required/requested depends on the service, but can include name, address, telephone number, credit card number, and the like. The identifying information about communications hub 210 may be in the form of serial number, MAC address or similar identifier. It can also be in the form of some other, more human-friendly identifier used to access stored information about the communications hub 210, for example a short phrase or number, bar code, QR code, or similar identifying information on a label, removable sticker, and the like. At step 1350 this information can be used by the remote service 160 to establish an inbound connection to communications hub 210, and flow can continue at step 1380.

If instead an external mechanism was not needed to configure at step 1320, control can move to step 1360. Here, remote service 160 can be contacted using the internal hardware, either using input directly from communications hub 210 or via devices 215 connected to communications hub 210. At step 1370, information can be provided to remote service 160, analogous to step 1340, however some information about the communications hub 210 may also be provided directly over the connection already established with remote service 160, eliminating the need for some information to be provided manually. Flow then can continue to step 1380 (an inbound connection to communications hub 210 need not be established, since this was already achieved at step 1360).

If the communications hub 210 does have internal communications capabilities and connectivity, the internal hardware is used to connect to the remote service at step 1340. In both cases, control continues to step 1350.

In various embodiments (not depicted in FIG. 13), the user powers up communications hub 210 and contacts the provider of remote service 160 as described above using an external mechanism, but rather than providing a code from the device, a combination of identifying information about the user and about unprovisioned communications hubs 210 currently contacting remote service 160 over pre-provisioned secondary network 140 can be used to identify communications hub 210. For example, if the end customer setting up service provides a service address in a certain location, or calls from a particular area code, this location is used for the customer. Remote service 160 then can scan to identify new (unprovisioned) ones communications hub 210 that have connected over secondary network 140, and appear to be near the end user. Location identification can be made in a number of ways, including identifying which service provider tower was used to communicate, GPS coordinates obtained from communications hub 210, and the like. When there are multiple possible communications hubs, remote service 160 may use a confirmation mechanism, for example displaying a code on communications hub 210, flashing an indicator on communications hub 210 in a particular pattern or color, and the like. In this way, communications hub 210 may be identified for the user on their behalf remotely.

In some embodiments, once the connection has been established and the communications hub contacted, configuration is completed and service commences at step 1380. This can include helping the end user properly configure a new connection over primary network 130.

Secondary network 140 can also be used for diagnostics on behalf of the end user. When an end user encounters a problem with the network configuration of any network connected device, in this case communications hub 210, it is often very difficult to diagnose. If communications hub 210 does not have connectivity, support personnel may be unable to assist in troubleshooting. In some embodiments, secondary network 140, connected via secondary broadband interface 240 via secondary network module 310 can be used for connectivity, allowing support staff to directly connect to the communications hub 210 and assist with configuration to use primary network 130.

In various embodiments, the service provider for secondary network 140 is pre-negotiated with remote service 160, and communications hub 210 is automatically configured for use in secondary network 140 for interaction with remote service 160. In this way, remote access by remote service 160 without additional configuration can be accomplished.

As described above, when an end customer is having trouble accessing remote service 160, they can contact technical support, for example, via web page or a phone call, and initiate a service request. As a part of this service request, the support personnel for remote service 160 can access communications hub 210 via secondary network 140, and verify configuration, modifying as indicated. The support personnel can verify network settings are correct, and run network diagnostics to check the quality of the end user's network.

Additionally or alternatively, when remote service 160 detects that data traffic from a particular one of communications hub 210 is consistently being routed over a secondary network 140, a diagnostic check may be initiated to determine why primary network 130 is not being used. In this way, the provider of remote service 160 may preemptively identify problems with configurations that would otherwise force traffic to (e.g., more expensive, particularly to the remote service 160 if they pay for such a network) secondary network 140.

Communications hub 210 devices may detect failures of primary network 130, and alert remote service 160 over secondary network 140. In this way, the operator of remote service 160 may quickly learn of widespread outages impacting many of their end users, and take appropriate action. For example, remote service 160 may directly contact the providers of service for the impacted primary network 130, accelerating detection and correction of problems by that provider. Remote service 160 may also alert the provider of secondary network 140 in such a case, ensuring they are prepared for the additional network traffic as many end user communications hub 210 devices switch to using secondary network 140.

Remote service 160 can have access to unique information as a result of having many of communications hub 210 connected in locations across a wide geographical area, and connected to many primary network 130 providers. The information can be used to obtain interesting and valuable knowledge, potentially unobtainable in other ways.

Communications hub 210 can provide storage, either internal (e.g., via storage module 385) or external, connected by external device module 340 (FIG. 3). Storage services (using this storage) are provided to device 215 using network protocols (e.g., server message block (SMB), common Internet file system (CIFS), network file system (NFS), and the like) over LAN 220. Additionally or alternatively, the distributed nature of the many communications hub 210 devices connected to remote service 160 allows for additional capabilities.

Storage on communications hub 210 may be automatically backed up to cloud-based servers maintained by remote service 160, providing the end user of communications hub 210 with a transparent backup process. Additional space in the cloud can also be provided to the end user, appearing to be storage provided by communications hub 210, for example, accessible in the same way as physical storage on communications hub 210.

Additionally or alternatively, the storage on communications hub 210 may be used as a cache for a cloud-based service, provided by remote service 160 or a third-party partner of the service providing communications hub 210. Cloud-based file services can operate by keeping a local copy of some or all files on each individual system, even if there are multiple systems (e.g., devices 215) on the same network, for example by keeping one copy each on multiple ones of device 215. This is highly wasteful for situations where many local devices (of device 215) may replicate exactly the same data. By caching files on communications hub 210, recently/frequently accessed files may be available locally on communications hub 210, with less-frequently-accessed files stored in the cloud. Transparently, the files are synchronized and maintained in the cloud by remote service 160. As only one local copy is kept by communications hub 210 instead of multiple local copies for each of device 215, additional storage space is available on those ones of device 215 that would otherwise be used for a (redundant) cache locally.

Storage may also be distributed in a peer-to-peer (P2P) fashion. Communications hub 210 may optionally set aside a portion of storage to be used by a collective P2P storage/backup system. This storage will then be unavailable to the end user of communications hub 210. However, in exchange, storage distributed across other ones of communications hub 210 is provided in its place. For reliability, the end user may only have a fraction (e.g., ½, ⅓, etc.) of the physical (local) storage space offered available in the distributed storage space. This allows for redundant storage of the information in multiple locations. Information shared across machines is split into chunks, encrypted, and distributed across non-local devices. Distributed hash table (DHT) or other similar P2P techniques can be utilized, managed by remote service 160, to distribute the information to be stored. In this way, data integrity is preserved by ensuring that a copy of important data is stored offsite.

Storage as described above—unlike conventional cloud-based approaches—does not have the data stored in complete form by any third party. Collectively, the fragments are available, scattered across many other end user's communications hub 210 storage, but the files do not exist in complete form in any one location. This is a highly desirable property of a backup system for some users.

Users wishing to have a private social network experience could leverage some combination of the P2P storage described above and the VPN capabilities described earlier to create a shared, access restricted system for content sharing across a number of communications hub 210 devices. Some embodiments include file sharing (e.g., videos, pictures, etc.), annotating the information, to providing social-network capabilities, or creating Wikis of information to share among the users. Only users authorized to access the shared information may have access, creating a tightly controlled, advertising-free social network for friends and family. The actual data stored can be distributed across the various end-user machines (e.g., participating communications hubs 810 and/or devices 215 equipped with appropriate software behind participating communications hubs 810), while access can be restricted either using credential-based services (e.g., for access from outside the distributed network 410), or limited to hosts within an established VPN.

Websites offering services and or goods for sale may provide referral links, where a visit leading to a purchase leads to a small commission or referral bonus being paid to individuals when new subscribers/purchasers visit via the referral link. In various embodiments, communications hub 210 can use deep packet inspection techniques to identify traffic destined for shopping sites, services, and other sites offering referral links. When detected, the data traffic can be redirected via the referral link. In various embodiments, (all) referral link translation can be transparent to the end user, and the revenue generated is realized as income for remote service 160.

Figure 11:
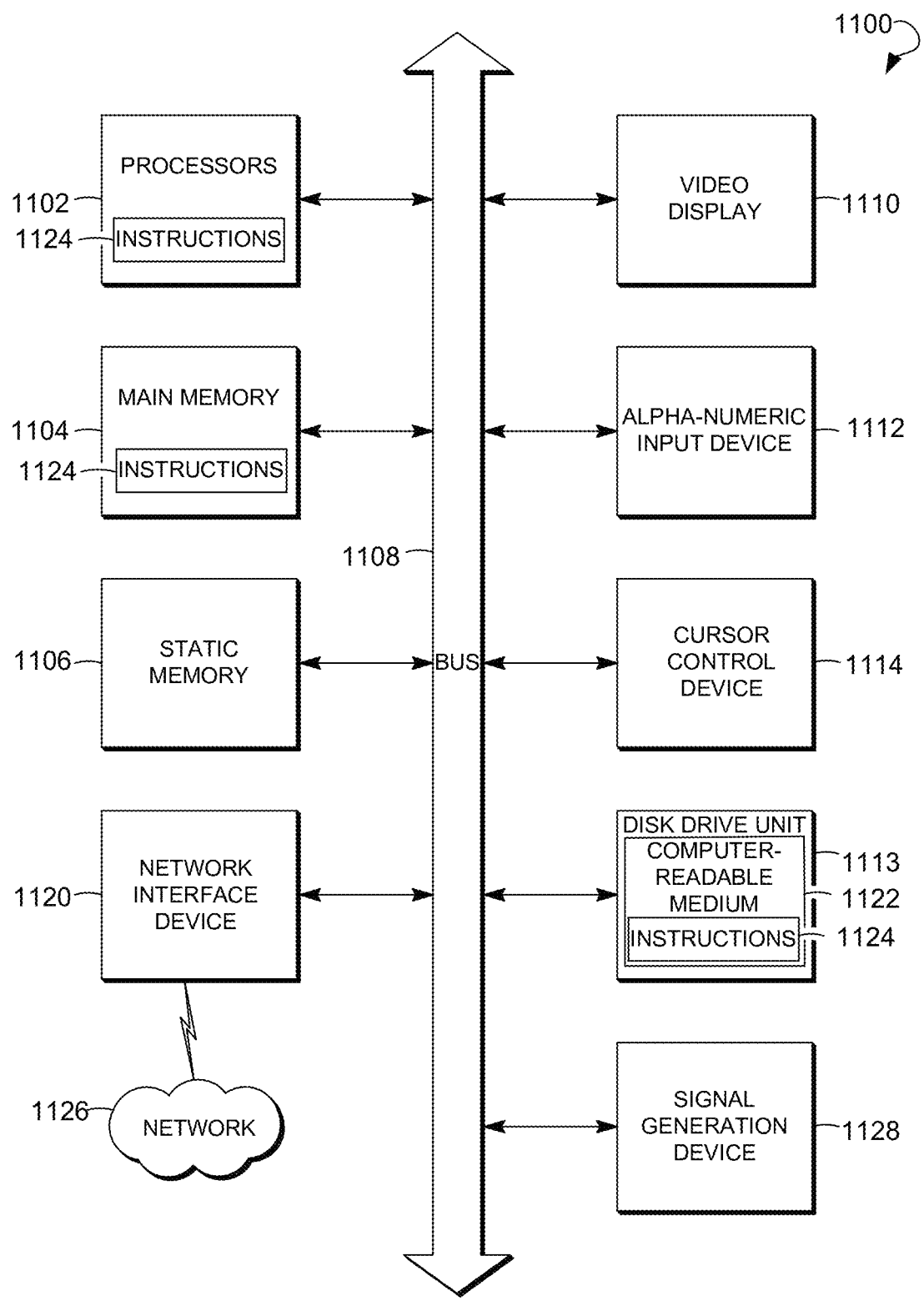
FIG. 11 is a simplified block diagram of a computing system, in accordance with some embodiments.

FIG. 11 shows a diagrammatic representation of a machine in the example electronic form of a computer system 1100, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box (STB), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor or multiple processors 1102 (e.g., a central processing unit (CPU), a graphics processing unit (GPU), or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 may also include an alphanumeric input device 1112 (e.g., a keyboard), a cursor control device 1114 (e.g., a mouse), a disk drive unit 1113, a signal generation device 1128 (e.g., a speaker), and a network interface device 1120.

The disk drive unit 1113 includes a non-transitory computer-readable medium 1122, on which is stored one or more sets of instructions and data structures (e.g., instructions 1124) embodying or utilized by any one or more of the methodologies or functions described herein. The instructions 1124 may also reside, completely or at least partially, within the main memory 1104 and/or within the processors 1102 during execution thereof by the computer system 1100. The main memory 1104 and the processors 1102 may also constitute machine-readable media.

The instructions 1124 may further be transmitted or received over a network 1126 via the network interface device 1120 utilizing any one of a number of well-known transfer protocols (e.g., Hyper Text Transfer Protocol (HTTP)).

In some embodiments, the computer system 1100 may be implemented as a cloud-based computing environment, such as a virtual machine operating within a computing cloud. In other embodiments, the computer system 1100 may itself include a cloud-based computing environment, where the functionalities of the computer system 1100 are executed in a distributed fashion. Thus, the computer system 1100, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Thus, methods and systems for filtering telephone calls have been disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for end point data communications anonymization for a local communications hub disposed in a local residence, the method comprising:
    receiving by the local communications hub a first request from a computing device, the first request being addressed to a server;
    requesting by the local communications hub, from a remote service, a randomly selected first remote communications hub;
    randomly selecting, by the remote service, the first remote communications hub from a plurality of remote communications hubs, the first remote communications hub being disposed in a geographically or topologically distinct location relative to the computing device;
    modifying the first request, by the local communications hub, to generate a first modified request by encapsulating the first request with remote headers, wherein the remote headers have a destination address of the remote service;
    sending the first modified request from the remote service to the first remote communications hub, the first remote communications hub modifying the first modified request to produce a second modified request, and the first remote communications hub forwarding the second modified request to the server, wherein the modifying includes extracting traffic data from the first modified request and the second modified request indicates the first remote communications hub as a source address;
    receiving, at the first remote communications hub, a first response to the second modified request from the server;
    modifying, by the first remote communications hub, the received first response to produce a first modified response, wherein modifying includes re-encapsulating the first response with headers having the remote service as a first modified response destination address;
    modifying the first modified response, by the remote service, to produce a second modified response, wherein the second modified response is modified to have a second modified source address of the server and a second modified destination address of the computing device; and
    providing the second modified response to the local communications hub and on to the computing device.

2. The method of claim 1 wherein
    the first modified request originates from the local communications hub and is addressed to the first remote communications hub,
    the second modified request originates from the first remote communications hub and is addressed to the server,
    the first modified response originates from the first remote communications hub and is addressed to the local communications hub, and
    the second modified response originates from the local communications hub and is addressed to the computing device.

3. The method of claim 1, further comprising:
    receiving a second request from the computing device, the second request being addressed to the server;

selecting a second remote communications hub from the plurality of remote communications hubs, the second remote communications hub being disposed in a second remote residence;

modifying the second request to generate a third modified request;

sending the third modified request to the second remote communications hub, the second remote communications hub modifying the third modified request to produce a fourth modified request, and the second remote communications hub forwarding the fourth modified request to the server;

receiving a third modified response from the second remote communications hub, the second remote communications hub receiving a second response to the fourth modified request from the server, and the second remote communications hub modifying the second response to produce the third modified response;

modifying the third modified response to produce a fourth modified response; and providing the fourth modified response to the computing device.

4. The method of claim 3 wherein:

the third modified request originates from the local communications hub and is addressed to the second remote communications hub, the fourth modified request originates from the second remote communications hub and is addressed to the server, the third modified response originates from the second remote communications hub and is addressed to the local communications hub, and the fourth modified response originates from the local communications hub and is addressed to the computing device.

5. The method of claim 1 wherein each of the plurality of remote communications hubs is disposed in at least one of a different city, county, and country from other remote communications hubs of the plurality of remote communications hubs.

6. The method of claim 1 wherein each of the plurality of remote communications hubs uses a different Internet service provider from other remote communications hubs of the plurality of remote communications hubs.

7. The method of claim 1 further comprising:

receiving an input from a user, the input indicating that data communications with the computing device are to be anonymized.

8. The method of claim 1 further comprising:

getting a list of the plurality of remote communications hubs from a communications service provider, the Internet being disposed between the local communications hub and the communications service provider.

9. The method of claim 3 wherein the first remote communications hub is communicatively coupled to the local communications hub using a first broadband data network and the second remote communications hub is communicatively coupled to the local communications hub using a second broadband data network.

10. The method of claim 9 wherein the first broadband data network and the second broadband data network are each at least one of cable Internet access, Digital Subscriber Line (DSL), and satellite Internet access.

11. The method of claim 9 wherein the first broadband data network and the second broadband data network are each at least one of mobile broadband and a wireless local area network (LAN).

12. A local communications hub disposed in a local residence, the local communications hub comprising:

a processor; and a memory communicatively coupled to the processor; the memory storing instructions executable by the processor to perform a method comprising:

receiving by the local communications hub a first request from a computing device, the first request being addressed to a server;

requesting from a remote service a randomly selected first remote communications hub;

randomly selecting a first remote communications hub from a plurality of remote communications hubs, the first remote communications hub being disposed in a geographically or topologically distinct location relative to the computing device;

modifying the first request to generate a first modified request by encapsulating the first request;

sending the first modified request to the first remote communications hub, the first remote communications hub modifying the first modified request by re-encapsulating the first modified request to produce a second modified request wherein headers of the second modified request have a source address of the first remote communications hub, and the first remote communications hub forwarding the second modified request to the server;

receiving a first modified response from the first remote communications hub, the first remote communications hub receiving a first response to the second modified request from the server, and the first remote communications hub modifying the first response by re-encapsulating the first response to produce the first modified response, wherein the re-encapsulation has the local communications hub as a destination address;

providing the first modified response to the computing device;

receiving a second request from the computing device, the second request being addressed to the server;

randomly selecting a second remote communications hub from the plurality of remote communications hubs, the second remote communications hub being disposed in a second remote residence;

modifying the second request by encapsulating the second request to generate a third modified request;

sending the third modified request to the second remote communications hub, the second remote communications hub modifying by encapsulating the third modified request to produce a fourth modified request, and the second remote communications hub forwarding the fourth modified request to the server;

receiving a third modified response from the second remote communications hub, the second remote communications hub receiving a second response to the fourth modified request from the server, and the second remote communications hub modifying the second response by encapsulating to produce the third modified response;

modifying the third modified response by encapsulating to produce a fourth modified response; and providing the fourth modified response to the computing device, wherein the encapsulating is performed so that the first request and the second request each appears not to have originated from the computing device.

13. The local communications hub of claim 12, wherein
the first modified request originates from the local communications hub and is addressed to the first remote communications hub,
the second modified request originates from the first remote communications hub and is addressed to the server,
the first modified response originates from the first remote communications hub and is addressed to the local communications hub, and
the second modified response originates from the local communications hub and is addressed to the computing device.

14. The local communications hub of claim 12 wherein
the third modified request originates from the local communications hub and is addressed to the second remote communications hub,
the fourth modified request originates from the second remote communications hub and is addressed to the server,
the third modified response originates from the second remote communications hub and is addressed to the local communications hub, and
the fourth modified response originates from the local communications hub and is addressed to the computing device.

15. The local communications hub of claim 12 wherein each of the plurality of remote communications hubs is disposed in at least one of a different city, county, and country from other remote communications hubs of the plurality of remote communications hubs.

16. The local communications hub of claim 12 wherein each of the plurality of remote communications hubs uses a different Internet service provider from other remote communications hubs of the plurality of remote communications hubs.

17. The local communications hub of claim 12 further comprising:
receiving an input from a user, the input indicating that data communications with the computing device is to be anonymized.

18. The local communications hub of claim 12 further comprising:
getting a list of the plurality of remote communications hubs from a communications service provider, the Internet being disposed between the local communications hub and the communications service provider.

19. The local communications hub of claim 12 wherein the first remote communications hub is communicatively coupled to the local communications hub using a first broadband data network and the second remote communications hub is communicatively coupled to the local communications hub using a second broadband data network.

20. The local communications hub of claim 19 wherein the first broadband data network and the second broadband data network are each at least one of cable Internet access, Digital Subscriber Line (DSL), and satellite Internet access.

21. A system for data communications anonymization for a local communications hub disposed in a local residence, the system comprising:
a local communications hub configured to receive a first request from a computing device, the first request being addressed to a server; and
a remote service configured to receive a request to randomly request a first remote communications hub from a plurality of remote communications hubs, and wherein the hub is disposed in a geographically or topologically distinct location relative to the local communications hub,
wherein the local communications hub is configured to modify the first request, to generate a first modified request by encapsulating the first request with remote headers, the remote headers have a destination address of the remote service,
wherein the remote service is configured to send the first modified request to the first remote communications hub,
wherein the first remote communications hub is configured to modify the first modified request to produce a second modified request and includes extracting traffic data from the first modified request and the second modified request indicates the first remote communications hub as a source address and forward the second modified request to the server,
wherein the first remote communications hub is configured to receive from the server a first response to the second modified request and to produce a first modified response, wherein modifying includes re-encapsulating the first response with headers having the remote service as a first modified response destination address;
wherein the remote service is configured to modify the first modified response to produce a second modified response having a second modified source address of the server and a second modified destination address of the computing device; and
wherein the second modified response is provided to the local communications hub and on to the computing device.

* * * * *